(12) United States Patent
Couwenhoven et al.

(10) Patent No.: US 8,018,623 B2
(45) Date of Patent: Sep. 13, 2011

(54) MULTI-LEVEL HALFTONING PROVIDING REDUCED ERROR DIFFUSION ARTIFACTS

(75) Inventors: Douglas W. Couwenhoven, Fairport, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 785 days.

(21) Appl. No.: 12/040,055

(22) Filed: Feb. 29, 2008

(65) Prior Publication Data

US 2009/0219577 A1 Sep. 3, 2009

(51) Int. Cl.
*G06K 15/00* (2006.01)
(52) U.S. Cl. .............. 358/3.06; 358/3.01; 358/3.03; 358/3.05; 358/1.9
(58) Field of Classification Search ............ 358/3.01, 358/3.03, 3.06, 3.05, 1.9
See application file for complete search history.

(56) References Cited

U.S. PATENT DOCUMENTS

| | | | |
|---|---|---|---|
| 5,111,310 A | 5/1992 | Parker et al. | |
| 5,214,517 A | 5/1993 | Sullivan et al. | |
| 5,317,418 A | 5/1994 | Lin | |
| 5,469,515 A | 11/1995 | Lin | |
| 5,586,203 A | 12/1996 | Spaulding et al. | |
| 5,754,311 A | 5/1998 | Ray | |
| 5,946,452 A | 8/1999 | Spaulding et al. | |
| 6,271,936 B1 * | 8/2001 | Yu et al. | 358/3.04 |
| 6,449,061 B2 | 9/2002 | Metcalfe | |
| 6,906,825 B1 * | 6/2005 | Nakahara et al. | 358/1.9 |
| 2005/0195438 A1 * | 9/2005 | Couwenhoven et al. | 358/3.05 |

OTHER PUBLICATIONS

R. W. Floyd et al, An Adaptive Algorithm for Spatial Greyscale, Proc. of the Society for Information Display, vol. 17, pp. 75-77 1976.
Qing Yu et al, Digital Multitoning Evaluation with a Human Visual Model, IS&T's NIP13: International Conference on Digital Printing Technologes, pp. 579-585 (1997).
S. Sugiura et al, An Improved Multilevel Error Diffusion Method, Jour. of Imaging Science and Technology, vol. 39, No. 6, pp. 495-501, 1995.

* cited by examiner

*Primary Examiner* — Twyler Haskins
*Assistant Examiner* — Michael Burleson
(74) *Attorney, Agent, or Firm* — Raymond L. Owens; Kevin E. Spaulding

(57) ABSTRACT

A method for multi-level error diffusion halftoning an input digital image to form an output digital image with reduced error diffusion texture contouring artifacts which includes modifying the input pixel values for a fraction of the input pixels using a periodic dither signal, where the fraction is a function of the texture artifact characteristics of the multi-level error diffusion halftoning process.

19 Claims, 18 Drawing Sheets

MULTI-LEVEL HALFTONING PROVIDING REDUCED ERROR DIFFUSION ARTIFACTS

CROSS REFERENCE TO RELATED APPLICATIONS

Reference is made to commonly assigned U.S. patent application Ser. No. 10/794,133 filed Mar. 4, 2004 (now U.S. Published Patent Application 2005/0195437) by Couwenhoven, et al., entitled "Color Error Diffusion", and commonly assigned U.S. patent application Ser. No. 10/795,011 filed Mar. 4, 2004 (now U.S. Published Patent Application 2005/0195438) by Couwenhoven, et al., entitled "Multi-level halftoning providing improved texture uniformity", the disclosure of which is herein incorporated by reference.

FIELD OF THE INVENTION

This invention pertains to the field of digital image processing, and more particularly to the field of digital halftoning.

BACKGROUND OF THE INVENTION

Digital halftoning is a technique employing digital image processing to produce a halftone output image from a continuous-tone image. For digital halftoning techniques, a continuous-tone input digital image is provided, for example, by scanning an original hardcopy image and storing digitized pixels in a computer. The digitized pixels include discrete digital input values typically ranging from 0 to 255. To reproduce this image on an output device capable of printing dots of one gray level (e.g., black), it is necessary to convert the continuous-tone input digital image to a binary output digital image using some form of digital halftoning algorithm. Halftoning methods rely on the fact that an observer's eye will spatially average over some local area of the image so that the appearance of intermediate gray levels can be produced by turning some of the pixels "on" and some of the pixels "off" in some local image region. The fraction of the pixels that are turned on will determine the apparent gray level. Common prior art methods of digital halftoning include error diffusion and periodic dithering.

Error diffusion is an adaptive algorithm that produces patterns with different spatial frequency content depending on the input image value. FIG. 1 shows a block diagram describing a basic error diffusion technique disclosed in "An Adaptive Algorithm for Spatial Greyscale," Proceedings of the Society for Information Display, Vol. 17, pp. 75-77, 1976, by R. W. Floyd and L. Steinberg. For purpose of illustration it will be assumed that the continuous-tone input values span the range from 0 to 255. A threshold operator 10 is applied to the input pixel value I(x,y) for the current input pixel with coordinates x and y to form the output pixel value O(x,y). The threshold operator 10 will return a 0 for any continuous-tone input value below the threshold, and a 255 for any continuous-tone input value above the threshold. A difference signal generator 12 receives the input pixel value I(x,y) and the output pixel value O(x,y), and produces an error signal e(x,y) by computing a difference between the output pixel value and the adjusted pixel value representing the error introduced by the thresholding process. The error signal e(x,y) is scaled by a series of error feedback weights W(x,y) using a weighted error signal generator 14, and is provided to an adder 16 which adds the weighted difference signal to the input pixel values of nearby pixels that have yet to be processed to form modified input pixel values. The propagation of the errors made during the thresholding process to the nearby pixels ensures that the arithmetic mean of the pixel values is preserved over a local image region.

FIG. 2 illustrates a typical set of error feedback weights W(x,y) that can be used to distribute the error e(x,y) to the nearby pixels. In this example, $7/16$ of the error is propagated to the next pixel on the same row of the image, $5/16$ of the error is propagated to the pixel directly below the current pixel on the next row of the image, and so forth. The halftone output from error diffusion is generally considered to be of high quality, since most of the halftone noise is distributed in a high spatial frequency band where human visual sensitivity is relatively low. However, the error diffusion halftoning technique is known to produce a number of objectionable artifacts. One artifact that is typically associated with error diffusion is known as "worms." Worms are formed when the black or white output pixels appear to string together in an area that should be otherwise uniform.

Compared to the error diffusion technique, ordered dither halftoning techniques are generally simpler in implementation. The ordered dither technique is typically implemented by forming a dither matrix having $M_x \times M_y$ elements that is tiled across the image. The elements of the dither matrix are distributed across the range of expected input tone values so that the full range of tones can be reproduced. A typical ordered dither halftoning method is illustrated in FIG. 3. A given pixel in the image has column and row addresses x and y, respectively, and an input pixel value I(x,y). Modulo operators 20 are used to determine indices $x_d$ and $y_d$ that are used to address the dither matrix 22. The threshold value $d(x_d,y_d)$ stored in the dither matrix at this address is then compared to the input pixel value I(x,y) using a comparator 24. If the input pixel value is equal to or below the threshold value, the output pixel value O(x,y) is set to "off"; if the value is above the threshold, the output pixel value O(x,y) is set to "on".

A second implementation of this basic technique is shown in FIG. 4. In this case the threshold value $d(x_d,y_d)$ is combined with the input pixel value I(x,y) using an adder 26. A fixed threshold operator 28 is then used to threshold the combined value to determine the output pixel value O(x,y).

Another implementation of this basic technique is shown in FIG. 5. In this case a set of k dither bitmaps 32 are formed corresponding to the halftone patterns formed when the dither matrix is thresholded at each input level k. The input pixel value I(x,y) is then used to select which of the dither bitmaps should be used for each pixel. Modulo operators 30 are used to determine indices $x_d$ and $y_d$ that are used to address the selected dither bitmap to determine the output pixel value O(x,y). This implementation has the advantage that fewer computations are required to process each pixel. It should be noted that any dither pattern that can be implemented using the methods of FIG. 3 and FIG. 4 can also be implemented using the method of FIG. 5. However, one can define a set of dither bitmaps for the method of FIG. 5 that could not be implemented using the other methods. This is because in the dither matrix implementations once a certain pixel is turned on at the input value corresponding to the threshold, it will stay on for all higher input pixel values. With the dither bitmaps approach this constraint is not present. For example, a certain location in the dither pattern could be "off" for an input pixel value of 150, "on" for an input pixel value of 151, and "off" again for an input pixel value of 152.

Yet another implementation of this basic technique is shown in FIG. 6. In this case a set of dither look-up tables (LUTs) 36 is used. The dither LUTs 36 are addressed by the input pixel value I(x,y) and store the corresponding output pixel value to be produced at some pixel location. Modulo operators 30 are used to determine indices $x_d$ and $y_d$ that are used to address a dither LUT selector 34 which selects one of the dither LUTs 36. The output pixel value $O(x,y)$ is determined by addressing the selected dither LUT with the input pixel value $I(x,y)$. This implementation also has the advantage that fewer computations are required to process each pixel. It should be noted that any dither pattern that can be implemented using the methods of FIG. 3 and FIG. 4 can also be implemented using the method of FIG. 6. However, as with the method shown in FIG. 5, it is also possible to define a set of dither LUTs 36 that could not be implemented using the other methods.

A variety of different dither matrices have been used in the past which produce resulting images with different visual characteristics. Common types include random dither matrices, clustered-dot dither matrices, and Bayer (dispersed dot) dither matrices. Sullivan, et al., U.S. Pat. No. 4,920,501, have introduced a technique to design dither bitmaps that have reduced visual modulation. These patterns are sometimes called "blue noise" patterns. They are attractive in that the patterns that are produced have reduced visibility to human observers, and as a result the images produced are visually pleasing relative to images produced using other dither patterns. The basic procedure involved in the production of these patterns is to use an optimization technique, such as stochastic annealing, to determine the arrangement of the matrix elements that reduces some visual cost function, typically based upon weighting the frequency components of the halftone patterns with a human visual sensitivity function. U.S. Pat. No. 4,920,501 also discloses an enhancement to this method, which insures that the bitmaps for each of the gray levels are correlated in such a way that they can be implemented using a dither matrix, U.S. Pat. No. 5,214,517. Other extensions to this basic approach include a method for simultaneously optimizing all of the gray levels, U.S. Pat. No. 5,754,311, a method for designing blue noise dither matrices for use with multilevel output devices, U.S. Pat. No. 5,586,203, and a method for producing partially correlated dither matrices, U.S. Pat. No. 5,946,452.

Parker, et al., U.S. Pat. No. 5,111,310, and Lin, U.S. Pat. Nos. 5,317,418 and 5,469,515, have also introduced techniques for the design of blue-noise dither patterns. Although the actual optimization methods that they have used are somewhat different, the resulting patterns are quite similar to those produced using the methods described in the Sullivan, et al. patents.

Recently, a wide variety of printing devices with multilevel output ($N_o$ output levels, where $N_o>2$) capability have been brought to the market to achieve higher image quality. Both ordered dither and error diffusion halftoning techniques can be generalized for these devices, in which case the halftoning methods are often referred to as "multi-level halftoning" or "multi-toning." For example, the conventional error diffusion process shown in FIG. 1 can be generalized to more than two output levels by replacing the threshold operator 10 with a quantization operator that selects one of the available output levels as a function of the modified input levels. Similarly, the ordered dithering technique shown in FIG. 4 can be generalized for more than 2 output levels by replacing the threshold operation 28 by a quantization operation. As before, the periodic dither signal is added to the input pixel value. The quantizer then maps the modulated input pixel value to one of the allowable output levels. In this case, the amplitude of the dither signal is generally scaled to be the same as the size of the quantization interval. Likewise, the ordered dither algorithms shown in FIG. 5 and FIG. 6 can also be generalized to more than 2 output levels by storing the desired multi-level output levels in the dither bitmaps 32 or the dither LUTs 36 rather than the binary output levels used in the 2-level implementations. Rather than storing complete dither LUTs for the multi-level implementation of FIG. 6, it can be desirable to store only the breakpoints where each LUT transitions from one output level to the next in order to reduce memory requirements. In this way, the LUT can be recreated as needed, or the input value can be directly tested against each of the breakpoints.

FIGS. 7A-E show a comparison of images produced from a continuous-tone gray wedge using several different halftoning algorithms. FIG. 7A shows output produced using a conventional binary error diffusion halftoning algorithm. Worm artifacts can be clearly seen in several areas of the tone scale, such as the light and dark ends of the gray wedge. Several of these worm artifacts are labeled as 70. FIG. 7B shows output produced using a conventional blue-noise dither algorithm. The dither matrix in this example was produced using the method of Sullivan, et al., U.S. Pat. No. 5,214,517. It can be seen that the worm artifacts associated with error diffusion have been limited, but that the overall graininess of the resulting image is somewhat higher than for error diffusion. This increased graininess 71 is particularly apparent in the mid-tone gray values.

FIG. 7C shows output produced using a multi-level error diffusion algorithm with three output levels ($N_o=3$). The same characteristic worm artifacts are present that were found in the binary error diffusion case. In addition, it can be observed that an objectionable texture/luminance contour 72 forms in the center of the tone scale near the intermediate output level. FIG. 7D shows output produced using a multi-level blue-noise dither algorithm, again with three output levels ($N_o=3$). A texture contour 73 can be observed near the intermediate output level, although it is not as severe as for the multi-level error diffusion case shown in FIG. 7C.

The texture contouring problem can be explained with the following analysis. For input image levels right at the output levels there is no halftone, or multitone, error introduced; therefore, there is no visual modulation necessary to produce the desired gray level. However, if the input level is a few code values away from those output levels, the output halftone pattern is rendered with sparse minority pixels over a uniform majority-pixel background. Since human visual system is very sensitive to these kinds of dot patterns, the perceived "grain" is much higher. Therefore, if a continuous-tone input image contains a smooth transition across this range of input levels, then, with the conventional multitoning approaches, there will be a distinct texture change in the output image which is observed as texture contouring within certain viewing distances.

Yu, et al. introduced an approach to smooth the texture transition at the N output levels for multilevel blue-noise dithering using over-modulated dither patterns in "Digital Multitoning Evaluation with a Human Visual Model," *IS&T's NIP13: International Conference on Digital Printing Technologies,* 579-585 (1997). Special blue-noise dither matrices were designed to precisely control the texture of the over-modulated patterns near the N output levels. It was found that over-modulated patterns resulting from a "binar" dither matrix were preferred by human observers over those from other dither matrices. The "binar" dither matrix is so named since its large dither matrix elements are paired with, and arranged to be adjacent to, its small dither matrix elements. An example of the over-modulation patterns from a "binar" dither matrix is shown in FIG. 8, where pixels of lower output level 80 and pixels of higher output level 81 are introduced in pairs within an otherwise uniform input image whose pixel values are equal to an intermediate output level 82.

Yu, et al. have extended the dither over-modulation approach to address the contouring artifacts associated with the multi-level error diffusion algorithm in U.S. Pat. No. 6,271,936. With this method, a blue-noise dither signal is added to the input pixel values for gray levels near the $N_o$ output levels. This has the effect of introducing over-modulated blue noise patterns at transition levels, limiting the undesirable texture contouring artifacts shown in FIG. 7C, while maintaining the lower granularity of the multi-level error diffusion algorithm at gray levels intermediate to the output levels. FIG. 7E shows output produced using the hybrid multi-level dither/error diffusion algorithm with three output levels ($N_o$=3). While this method does substantially reduce texture contouring near the output levels, which is one of the most objectionable artifacts associated with multi-level error diffusion, it does not address the worm artifacts that are characteristic of error diffusion. These worm artifacts can still be seen in FIG. 7E where a number of them are labeled as 74.

"An Improved Multilevel Error Diffusion Method," Journal of Imaging Science and Technology, Vol. 39, No. 6, pp. 495-501, 1995, by S. Sugiura, et al. discloses adding noise using a 4 by 4 ordered dither matrix for a wide range of input pixel values around the N output levels, thus limiting the texture contouring at the N output levels for multilevel error diffusion. However, this is at the expense of increased halftone visibility over a wide range of the tone scale, and the interaction between ordered dither matrix and error diffusion could result in artifacts due to the lack of precise control of halftone patterns around the N output levels.

Metcalfe, et al., U.S. Pat. No. 6,449,061, disclose a way for reducing "pattern shifting artifacts" in an error diffusion algorithm by adding random noise, or patterned noise to the error diffusion threshold value. The amplitude of the noise is adjusted according to an image classification of the pixel being processed. This approach has the disadvantage that the noise that is introduced is quite dissimilar to the noise characteristics of the error diffusion process, and therefore is not well-suited to producing consistent texture characteristics across the tone scale. It also requires an image classification step that can be quite complex.

SUMMARY OF THE INVENTION

It is an object of the present invention to provide an effective way for multi-level halftoning an input digital image to produce images with pleasing textures.

These objects are achieved by a method for multi-level error diffusion halftoning an input digital image having input pixels with corresponding input pixel values and $N_i$ input levels to form an output digital image with reduced error diffusion texture contouring artifacts, such an output digital image having output pixels with corresponding output pixel values and $N_o$ output levels, where $2 \leq N_o < N_i$, comprising:

a) determining a fraction of input pixels to be modified using a periodic dither signal in response to the input pixel value of the input pixel, wherein the fraction of input pixels is a function of the texture artifact characteristics that would result from the application of a multi-level error diffusion halftoning process to a uniform image region having the particular input pixel value, the fraction of input pixels being larger for input pixel values that would produce visually objectionable texture artifact characteristics than for input pixel values that would produce visually pleasing texture characteristics;

b) modifying the input pixel values for the determined fraction of input pixels using a periodic dither signal determined by modularly addressing a dither signal array with the row and column address of the input pixel in the input digital image, wherein the dither signal array is designed to produce periodic dither signals having low visibility to a human observer;

c) applying the multi-level error diffusion halftoning process to the adjusted pixel value to determine the output pixel value; and d) repeating steps a)-d) for multiple input pixels of the input digital image to thereby provide the output digital image.

The present invention has the advantage that it can produce pleasing multi-level halftone images without the presence of objectionable texture artifacts, and without a significant increase in the overall noise level of the image compared to conventional error-diffusion halftoning processes. It has the additional advantages that texture contouring and luminance contouring artifacts are also substantially reduced, and that the texture characteristics across the tone scale are much more uniform. Further, it has the advantage that it offers more direct control of how multi-level dither halftone patterns are introduced to reduce the objectionable texture artifacts.

DETAILED DESCRIPTION OF THE INVENTION

Figure 9:
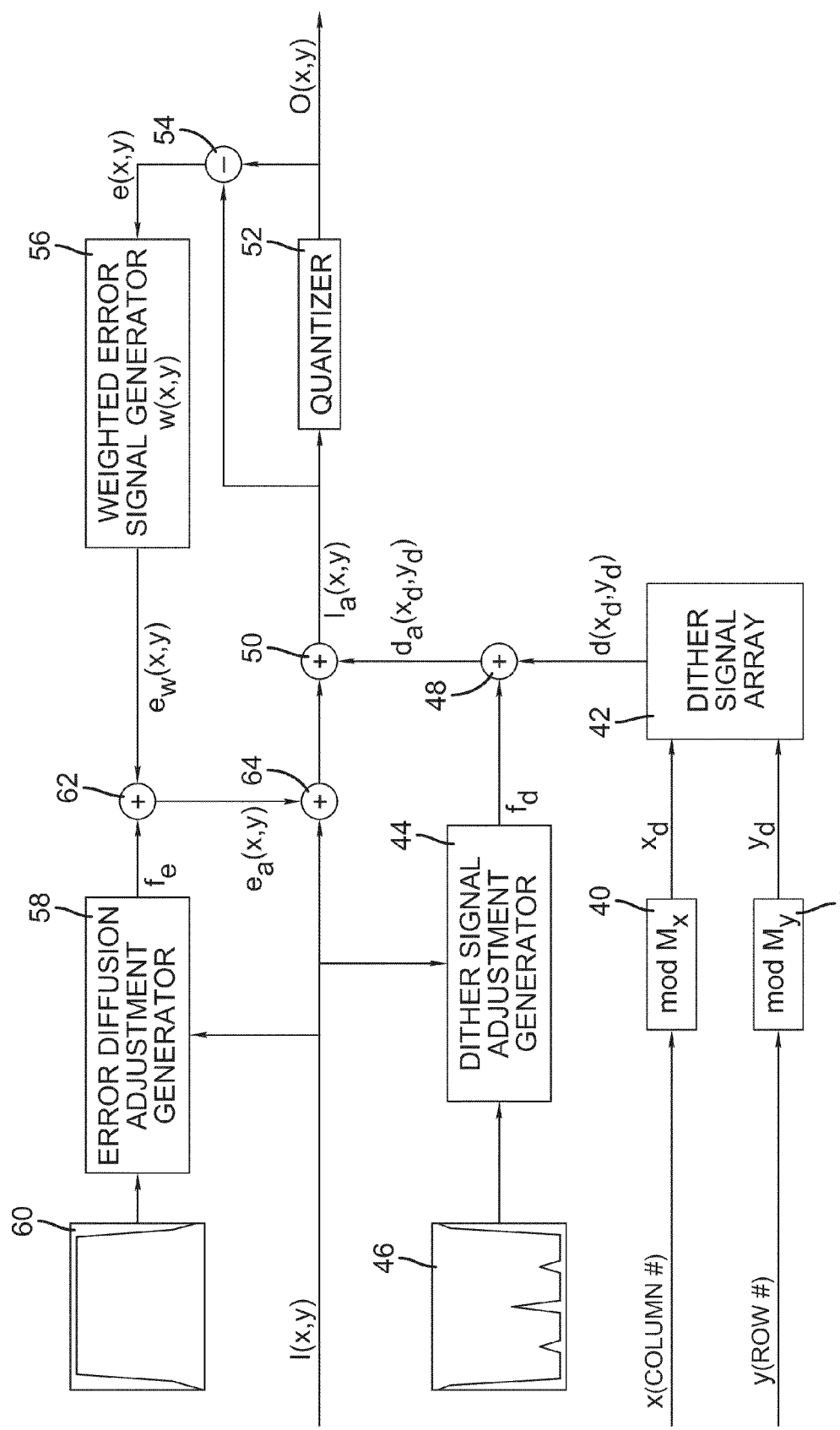
FIG. 9 is a flow diagram showing a prior art multi-toning method combining error diffusion and ordered dither.

Turning now to FIG. 9, there is shown a flow diagram illustrating a multi-level halftoning method disclosed in above-cited commonly assigned U.S. patent application Ser. No. 10/795,011 by Couwenhoven et al. entitled "Multi-level halftoning providing improved texture uniformity". This method can be used to process an input digital image having input pixels with corresponding input pixel values, $I(x,y)$, and $N_i$ input levels, to form an output digital image having output pixels with corresponding output pixel values $O(x,y)$ and $N_o$ output levels, where $2 \leq N_o < N_i$. The column and row addresses of the input pixel are given by x and y, respectively. Modulo operators 40 are used to determine indices $x_d$ and $y_d$ into a dither signal array 42 from the row and column addresses x and y. The dither signal array 42 is used to determine a periodic dither signal value $d(x_d, y_d)$, which is designed to have low visibility to a human observer.

A dither signal adjustment generator 44 is used to determine a dither signal adjustment factor $f_d$ responsive to the input pixel value $I(x,y)$. In a preferred embodiment of the method of Couwenhoven et al., this is accomplished using a dither signal adjustment function 46 which returns a dither signal adjustment factor $f_d$ as a function of the input pixel value $I(x,y)$. Generally the dither signal adjustment function 46 would be implemented using a look-up table (LUT), although it will be obvious that many other implementations will suggest themselves to one skilled in the art. In a preferred embodiment of the method of Couwenhoven et al., a multiplier 48 is then used to scale the periodic dither signal value $d(x_d, y_d)$ according to the dither signal adjustment factor $f_d$ to produce an adjusted periodic dither signal value $d_a(x_d, y_d)$.

The dither signal adjustment function 46 adjusts the amplitude of the periodic dither signal value $d(x_d, y_d)$ such that the amplitude adjustment is a function of the texture characteristics that would result from the application of a multi-level error diffusion halftoning process to a uniform image region having the particular input pixel value, the amplitude of the adjusted periodic dither signal value $d_a(x_d, y_d)$ being larger for input pixel values where the multi-level error diffusion halftoning process produces visually objectionable texture characteristics (e.g., worm artifacts, texture contours, or the like) and smaller for input pixel values that where it produces visually pleasing texture characteristics.

Optionally, the dither signal adjustment function 46 can be designed to produce over-modulation near the N output levels as was described by Yu in U.S. Pat. No. 6,271,936. This is accomplished by increasing the amplitude of the periodic dither signal value $d(x_d, y_d)$ to be larger than the quantization interval size associated with multi-level error diffusion halftoning process in those portions of the tone scale.

The adjusted periodic dither signal value $d_a(x_d, y_d)$ is then combined with the input pixel value $I(x,y)$ to produce an adjusted pixel value $I_a(x,y)$. In a preferred embodiment of the method of Couwenhoven et al., this is accomplished using an adder 50, although it is possible that the adjusted periodic dither signal value $d_a(x_d, y_d)$ could be combined with the input pixel value $I(x,y)$ in other ways. For example, they could be multiplied together, or they could be combined using some other type of function.

Next, a multi-level error diffusion halftoning process is applied to the adjusted input pixel value $I_a(x,y)$ to determine an output pixel value $O(x,y)$. This generally involves several steps. First, a quantizer 52 is used to map the adjusted input pixel value $I_a(x,y)$ to a corresponding output pixel value $O(x,y)$. For the case of a binary output image, the quantizer 52 will be a simple threshold function. For cases where the output image has more than two levels, the quantizer can be implemented using an integer divide operation, or using a quantization LUT, as is well known to one skilled in the art. A difference signal generator 54 is then used to compute an error signal $e(x,y)$ representing the difference between the adjusted input pixel value $I_a(x,y)$ and the output pixel value $O(x,y)$. The error signal $e(x,y)$ represents the quantization error introduced by the quantizer 52. In a preferred embodiment of the method of Couwenhoven et al., the difference signal generator 54 simply subtracts the adjusted input pixel value $I_a(x,y)$ from an appropriately scaled version of the output pixel value $O(x,y)$. Next, a weighted error signal generator 56 is used to scale the error signal $e(x,y)$ by a series of error feedback weights $W(x,y)$ to produce a set of weighted error signal $e_w(x,y)$ that are adapted to be added to the input pixel values of nearby pixels that have yet to be processed using an adder 64 to form modified input pixel values. The propagation of the errors made during the thresholding process to the nearby pixels is intended to ensure that the arithmetic mean of the pixel values is preserved over a local image region.

Optionally, the amplitude of the set of weighted error signals $e_w(x,y)$ can be adjusted in a manner analogous to the way that the amplitude of the periodic dither signal was adjusted. In this case, an error diffusion adjustment generator 58 is used to determine an error diffusion adjustment factor $f_e$ responsive to the input pixel value $I(x,y)$. In a preferred embodiment of the method of Couwenhoven et al., this is accomplished using an error diffusion adjustment function 60 which returns an error diffusion adjustment factor $f_e$ as a function of the input pixel value $I(x,y)$. Generally, the error diffusion adjustment function 60 would be implemented using a look-up table (LUT). In a preferred embodiment of the method of Couwenhoven et al., a multiplier 62 is then used to scale the set of weighted error signals $e_w(x,y)$ according to the error diffusion adjustment factor $f_e$ to produce an adjusted error signal $e_a(x,y)$. Alternatively, it would be equivalent to use the error diffusion adjustment factor $f_e$ to scale the original error signal $e(x,y)$ or the error feedback weights $W(x,y)$ rather than the set of weighted error signals $e_w(x,y)$.

The error diffusion adjustment function 60 adjusts the amplitude of the set of weighted error signals $e_w(x,y)$ such that the amplitude adjustment is a function of the texture characteristics that would result from the application of the multi-level error diffusion halftoning process to a uniform image region having the particular input pixel value. In one embodiment of the method of Couwenhoven et al., the amplitude of the adjusted error signal $e_a(x_d, y_d)$ is smaller for input pixel values where the multi-level error diffusion process would produce visually objectionable texture characteristics (e.g., worm artifacts, texture contours, or the like) and larger for input pixel values where it would produce visually pleasing texture characteristics. Alternatively, in some cases, it can only be desirable to reduce the amplitude of the adjusted error signal for input pixel values near the $N_o$ output levels and leave it larger for input pixel values intermediate to the $N_o$ output levels.

Figure 1:
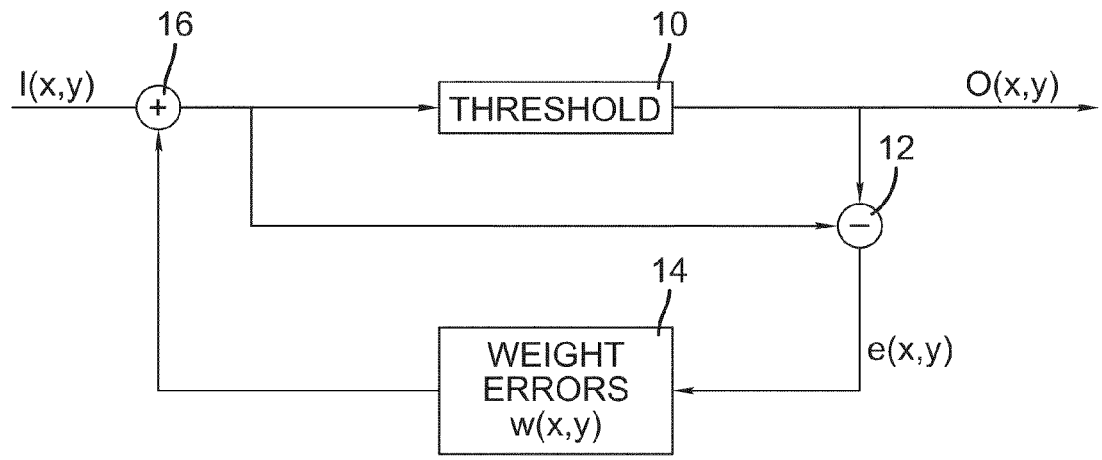
FIG. 1 is flow diagram of a prior art error diffusion process.
Figure 2:
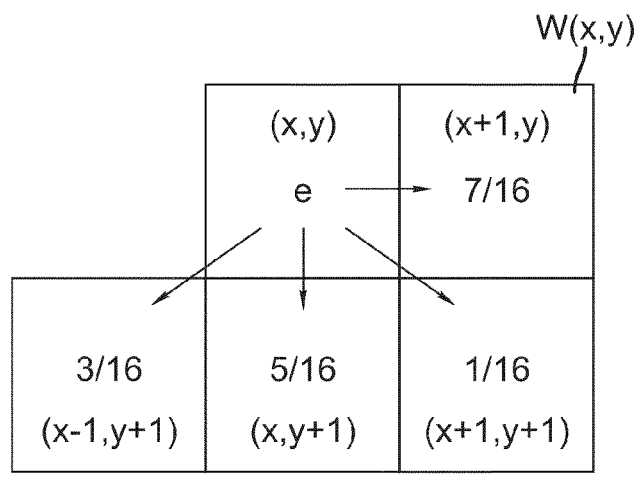
FIG. 2 shows a set of typical error feedback weights used in the FIG. 1 arrangement.
Figure 3:
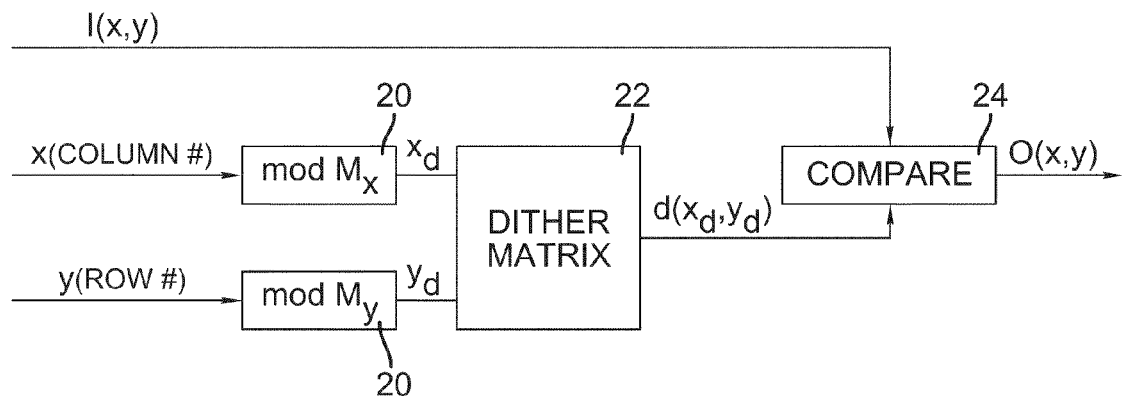
FIG. 3 is a flow diagram of a prior art ordered dither process using a threshold matrix.
Figure 4:
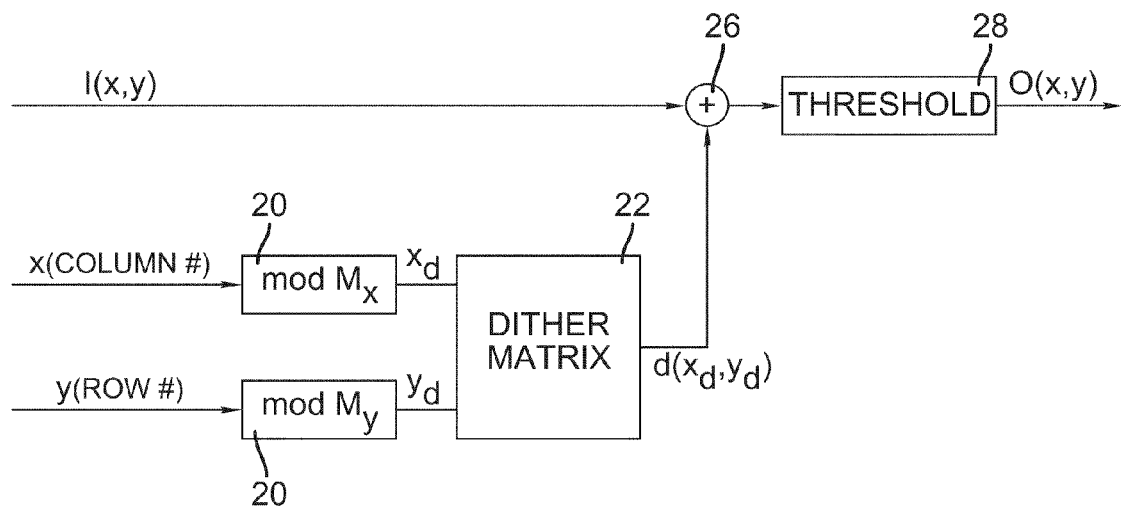
FIG. 4 is a flow diagram of a prior art ordered dither process utilizing an added dither signal.
Figure 5:
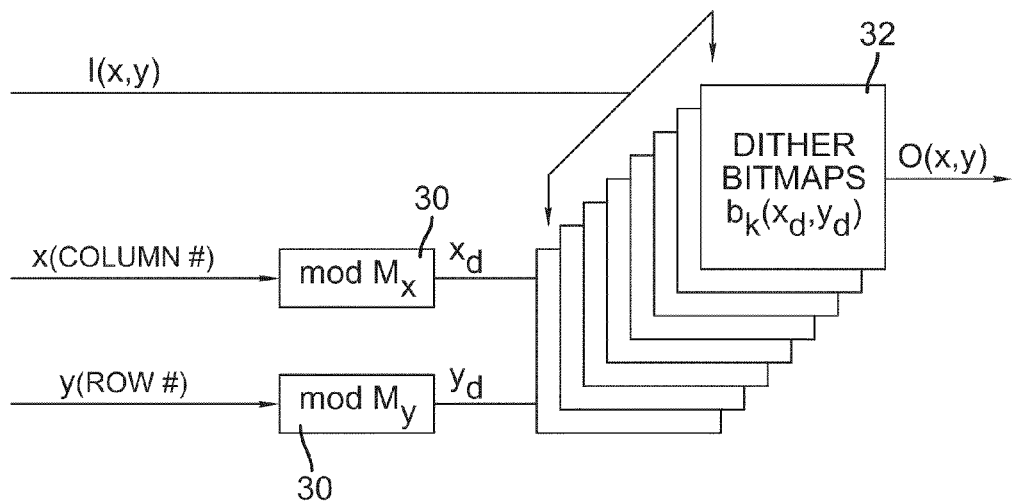
FIG. 5 is a flow diagram of a prior art ordered dither process using a set of dither bitmaps.
Figure 6:
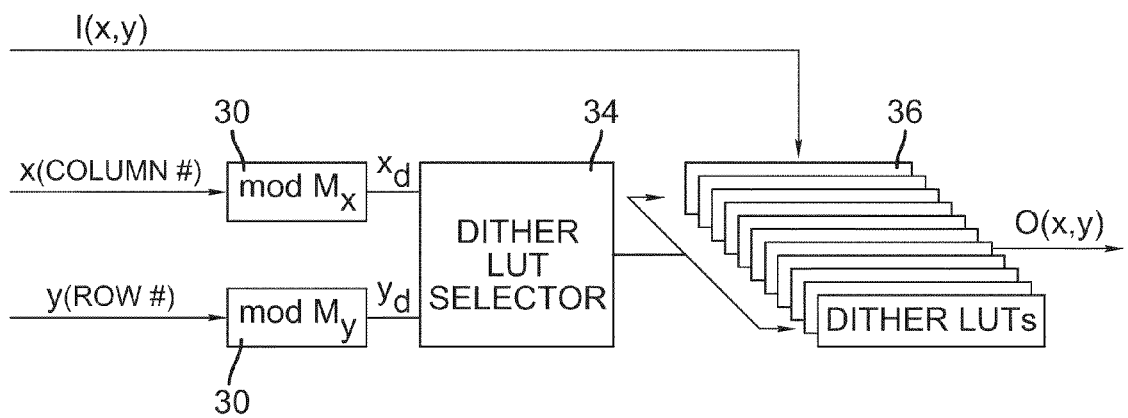
FIG. 6 is a flow diagram of a prior art ordered dither process using a set of dither LUTs.
Figure 7A:
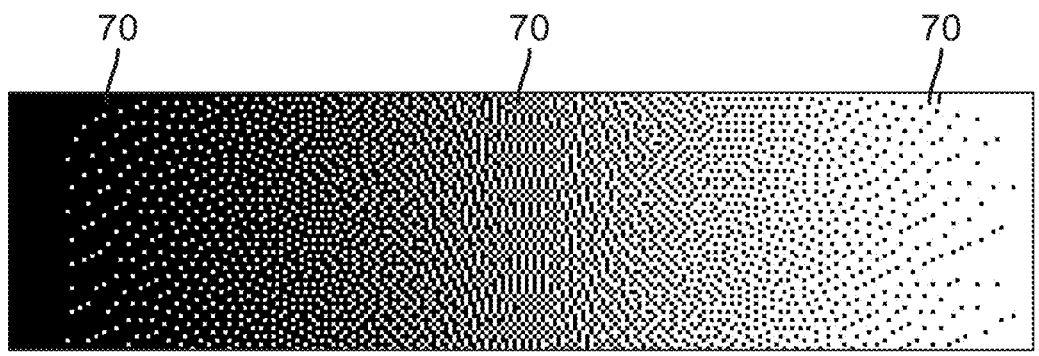
FIGS. 7A-E depict a set of prior art gray wedges comparing output from (A) a binary error diffusion process; (B) a binary blue-noise dither process; (C) a 3-level error diffusion process; (D) a 3-level blue-noise dither process; and (E) a 3-level dither-diffusion process.
Figure 7B:
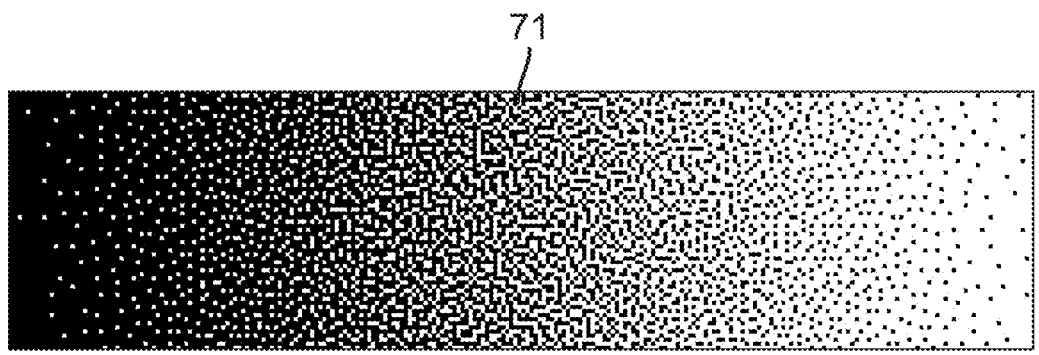
Figure 7C:
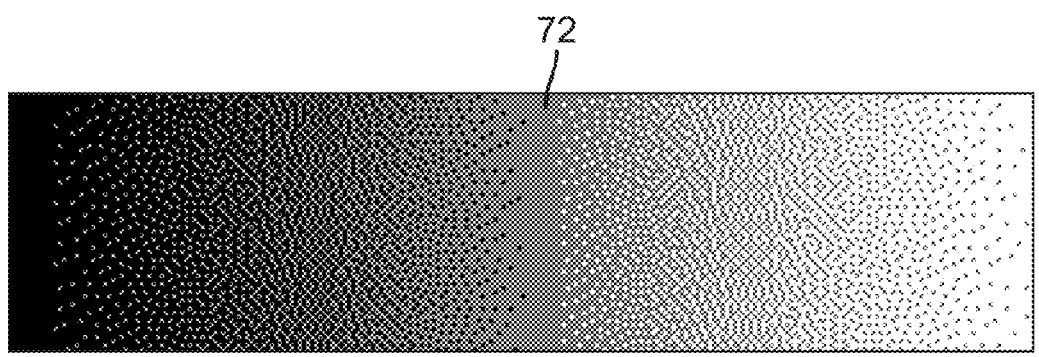
Figure 7D:
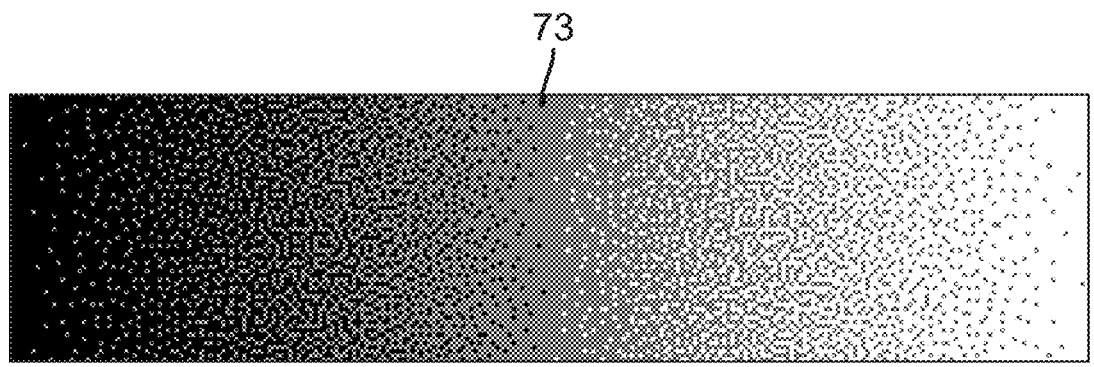
Figure 7E:
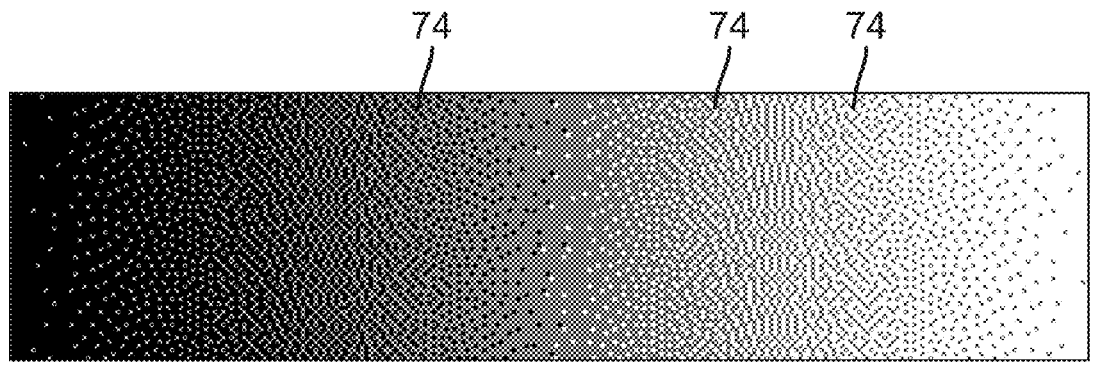

There are a number of ways that the periodic dither signal value $d(x_d,y_d)$ can be determined using the dither signal array 42. In one method, the dither signal array 42 is simply a dither matrix analogous to that used in the method of FIG. 4. In this case, the dither signal array 42 stores an array of periodic dither values that are modularly addressed using the x and y addresses of the input pixel to determine the periodic dither signal value $d(x_d,y_d)$. In another embodiment of the method of Couwenhoven et al., the dither signal array 42 is an array of dither LUTs analogous to that used in the method of FIG. 6. In this case, the dither signal array stores pointers to a set of dither LUTs. A particular dither LUT is selected by modularly addressing the dither signal array 42 using the x and y addresses of the input pixel. The selected dither LUT is then addressed using the input pixel value I(x,y) to determine the resulting periodic dither signal value $d(x_d,y_d)$. Similarly, other implementations can also be used such as where the dither signal array 42 is an array of dither bitmaps analogous to the arrangement shown in FIG. 5. As was the case for conventional periodic dither halftoning algorithms, the dither LUT and the dither bitmaps methods offer the greatest flexibility for controlling the distribution and arrangement of the periodic dither signal values $d(x_d,y_d)$ since there are more degrees of freedom to adjust the characteristics of the periodic dither signal as a function of the input pixel value I(x,y).

In order for the periodic dither signal to smoothly blend with the halftone textures produced by the multi-level error diffusion process, it is desirable that the dither signal array be designed to produce a periodic dither signal having similar spatial frequency characteristics to the halftone patterns produced by the multi-level error diffusion halftoning process. The spatial frequency characteristics that are associated with error diffusion algorithms are generally referred to as "blue-noise". These patterns are desirable because they have low visibility to a human observer due to the fact that they have very little low spatial frequency content. Periodic dither signals having this same general characteristic are typically referred to as "blue-noise dither" signals.

In one preferred embodiment of the method of Couwenhoven et al., the dither signal array is determined by using an optimization process to determine the dither signals that reduce a visual cost function as taught by Sullivan, et al. in U.S. Pat. Nos. 4,920,501 and 5,214,517. Such methods produce dither patterns that have spatial frequency characteristics quite similar to those produced by error diffusion processes. Other methods can also be used to produce dither signals having similar spatial frequency characteristics. A summary of these techniques is given by Spaulding, et al. in "Methods for generating blue-noise dither matrices for digital halftoning," published in the Journal of Electronic Imaging, Vol. 6, pp. 208-230, 1997.

Figure 8:
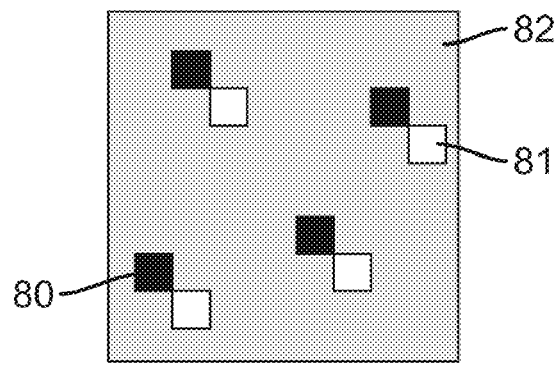
FIG. 8 depicts a sample prior art image of over-modulated multi-toning patterns from a "binar" dither matrix.

For cases where the amplitude of the periodic dither signal is adjusted to produce over-modulation near the N output levels, it is desirable to use blue-noise dither matrices that are designed to produce "binars" as was described earlier with reference to FIG. 8. With these dither matrices, dither array elements producing large dither signals are paired with, and arranged to be adjacent to, dither array elements producing small dither signals. Such patterns have been found to be preferred by human observers over those from other types of dither matrices. Methods for designing periodic dither signals satisfying this criterion have been described by Yu, et al. in "Digital multitoning evaluation with a human visual model,"
IS&T's NIP13: International Conference on Digital Printing Technologies, pp. 579-585 (1997).

There are many ways that could be used to determine the exact form of the dither signal adjustment function 46. In a preferred embodiment of the method of Couwenhoven et al., the amplitude of the dither signal adjustment function 46 is determined to be approximately proportional to the magnitude of any undesirable texture characteristics that occur in halftone patterns produced by the multi-level error diffusion process.

There are numerous ways that the magnitude of any undesirable texture characteristics can be measured or estimated. For example, various metrics are well known to those skilled in the art for estimating the perceived granularity of noisy uniform patterns using calculations, such as integrals of the noise power spectrum weighted by the human visual system transfer function. Other more sophisticated human vision models could also be used to estimate the texture visibility value, or the visual difference between a continuous tone gray field and a halftone pattern. Using such metrics, one strategy for determining the amplitude of the dither signal adjustment function 46 is to select the values that make the perceived granularity or the texture visibility most uniform across the tone scale while reducing the overall visibility of the halftone patterns. As opposed to using a purely algorithmic approach to determining the dither signal adjustment function 46, one can also manually determine or refine the form of the dither signal adjustment function 46 by visually examining halftone patterns produced by the algorithm and adjusting the amplitude of the dither signal adjustment function 46 at each input pixel value to produce the most uniform or visually pleasing textures or both.

There will generally be several isolated gray levels that are particularly prone to producing objectionable texture artifacts. For example, input levels that exactly correspond to one of the output levels will produce perfectly uniform output images, and will therefore have very different textures than those for nearby gray levels. Likewise gray levels that are very near to one of the output levels are also very susceptible to "worm" artifacts. Additionally, gray levels that are halfway, one third of the way, and one quarter of the way between adjacent output levels are often susceptible to worm artifacts and other forms of texture artifacts. Therefore, it will generally be desirable for the dither signal adjustment function 46 to be larger near one or more of these input pixel values, and smaller for other nearby input pixel values, resulting in local maxima (peaks) for the dither signal adjustment function 46 at these input pixel values.

Figure 10:
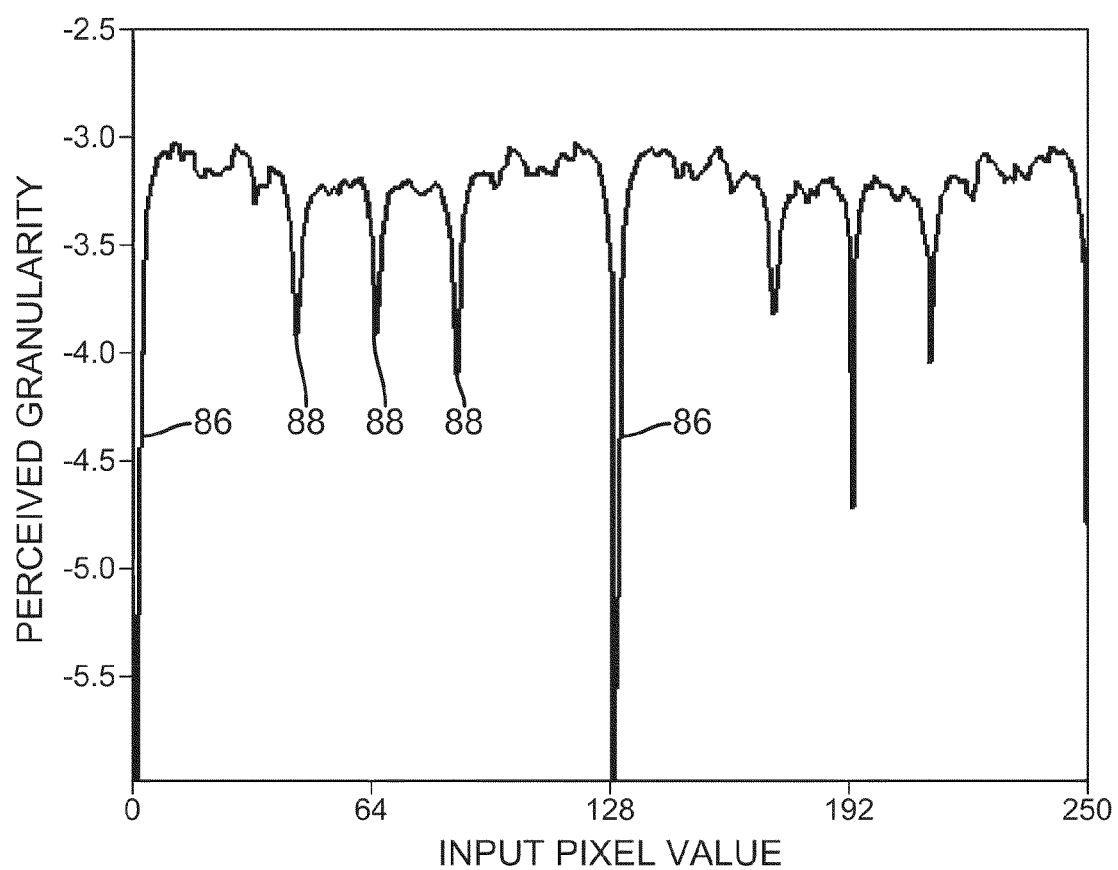
FIG. 10 shows a granularity vs. input pixel value relationship for a conventional 3-level error diffusion algorithm.

An example of a perceived granularity function showing the relationship between perceived granularity and input pixel value for a typical 3-level error-diffusion halftoning process is shown in FIG. 10. This perceived granularity function was determined using the following model to estimate the perceived granularity:

$$G = \log\left(\frac{1}{(N_x N_y)} \sum_{f_x} \sum_{f_y} |O(f_x, f_y) CSF(f_x, f_y)|^2\right) \quad (1)$$

where:
G is the perceived granularity metric;
$f_x$ and $f_y$ are horizontal and vertical spatial frequencies, respectively,
$N_x$ and $N_y$ are the number of horizontal and vertical spatial frequencies, respectively;

$O(f_x,f_y)$ is the Fourier transform of the output halftone pattern at a given gray level; and $CSF(f_x,f_y)$ is the human visual system contrast sensitivity function. It can be seen that there are a number of bumps and notches in the perceived granularity function corresponding to gray levels where the texture of the halftone pattern changes suddenly. Notches labeled 86 correspond to the tone levels where the input value is mapped directly to one of the output levels, and the notches labeled 88 correspond to intermediate gray levels where the error diffusion process produces various texture artifacts.

Figure 11:
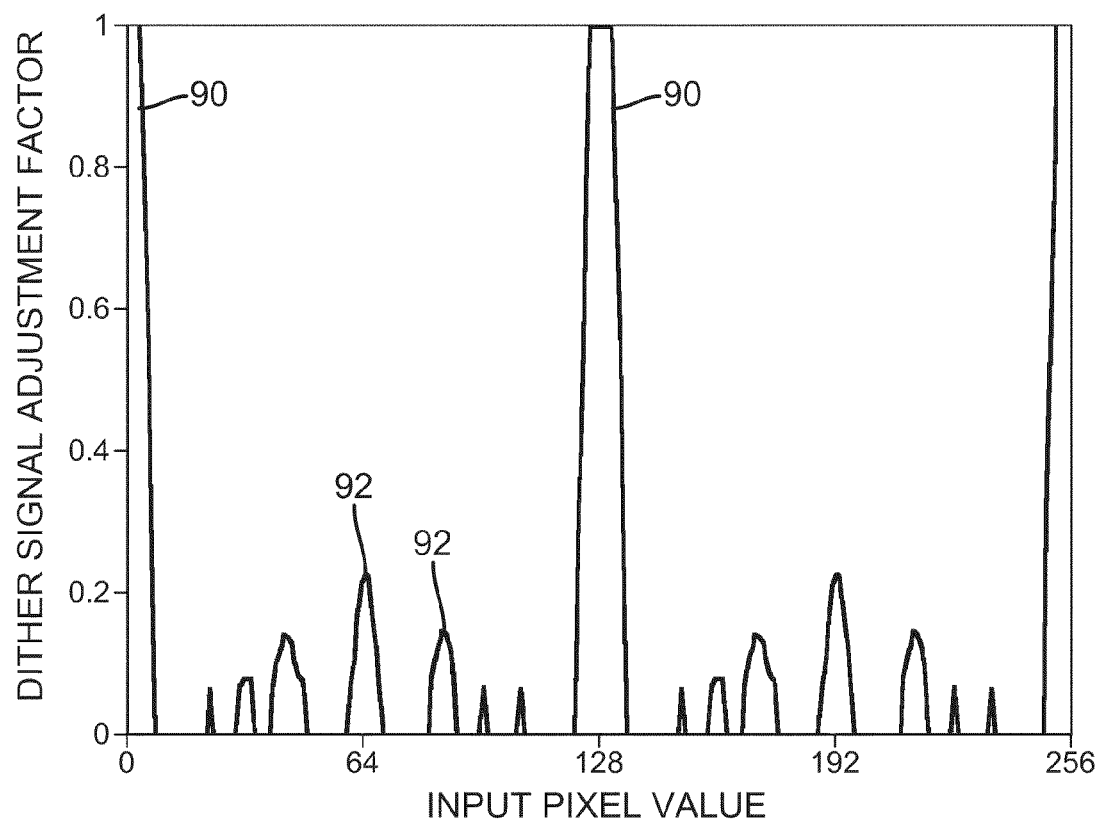
FIG. 11 illustrates a typical dither signal adjustment function for use with the method of FIG. 9.

An example of a dither signal adjustment function 46 is shown in FIG. 11 that is designed to be used with the 3-level error-diffusion halftoning process that produced the perceived granularity function shown in FIG. 10. It can be seen that the dither signal adjustment function 46 has peaks near input values of 0, 128 and 255 corresponding to the output levels, labeled as 90 in the figure. It also has a series of intermediate dither signal adjustment function peaks (i.e., local maxima) corresponding to other input pixel values that produce objectionable texture artifacts, labeled as 92 in the figure.

Figure 12:
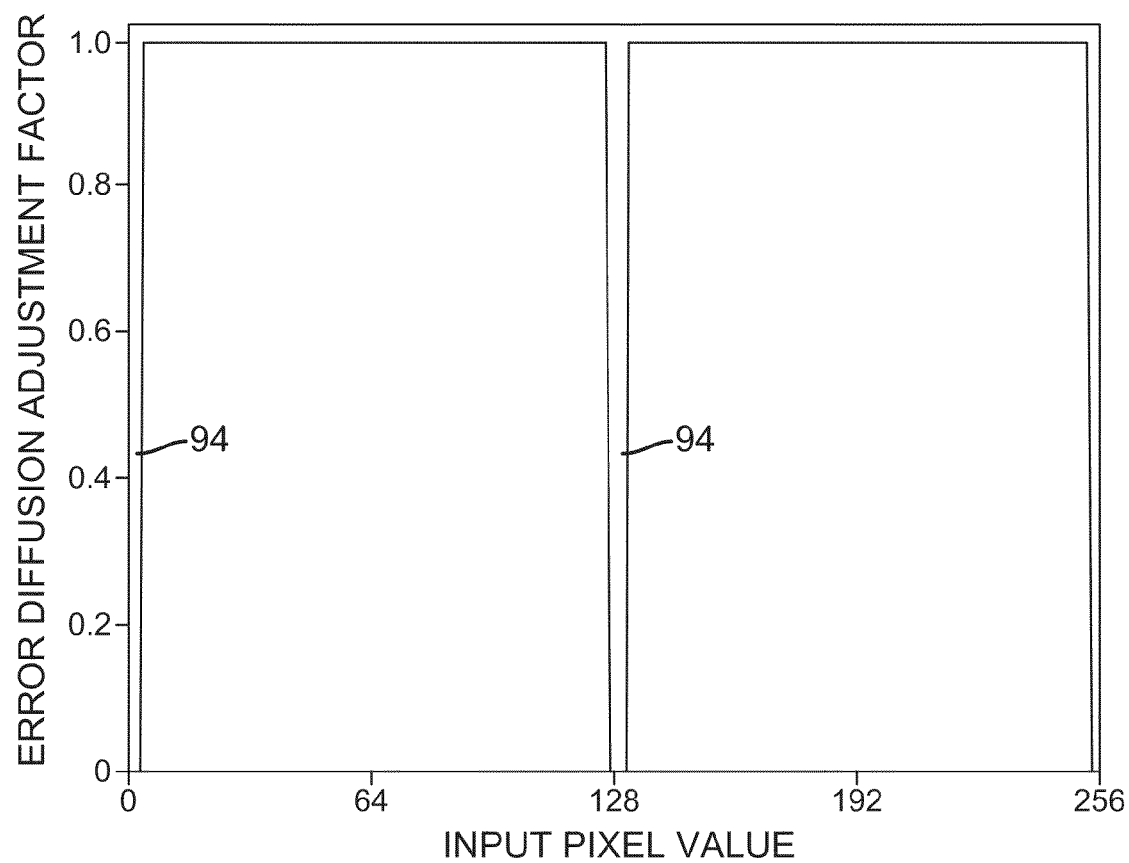
FIG. 12 illustrates a typical error diffusion adjustment function for use with the method of FIG. 9.

Likewise, there are also many ways that the error diffusion adjustment function 60 can be determined. Often it will be desirable for the error diffusion adjustment function 60 to be inversely related to the dither signal adjustment function 46 so that where one is small, the other will be large, and vice versa. However, this is not a requirement. For example, it can be desirable to reduce the amplitude of the error diffusion adjustment function 60 near the output levels, but not for any intermediate peaks in the dither signal adjustment function 46. An example of a typical error diffusion adjustment function 60 is shown in FIG. 12 for the case of three output levels. It can be seen that the error diffusion adjustment function 60 has local minima near input values of 0, 128 and 255, corresponding to the output levels, labeled as 94 in the figure.

Figure 13:
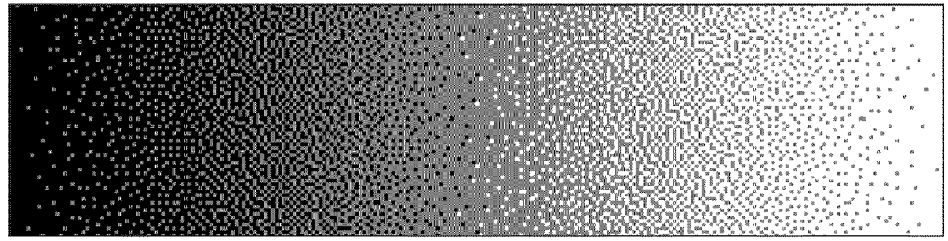
FIG. 13 depicts a gray wedges illustrating output produced using the method of FIG. 9.
Figure 14:
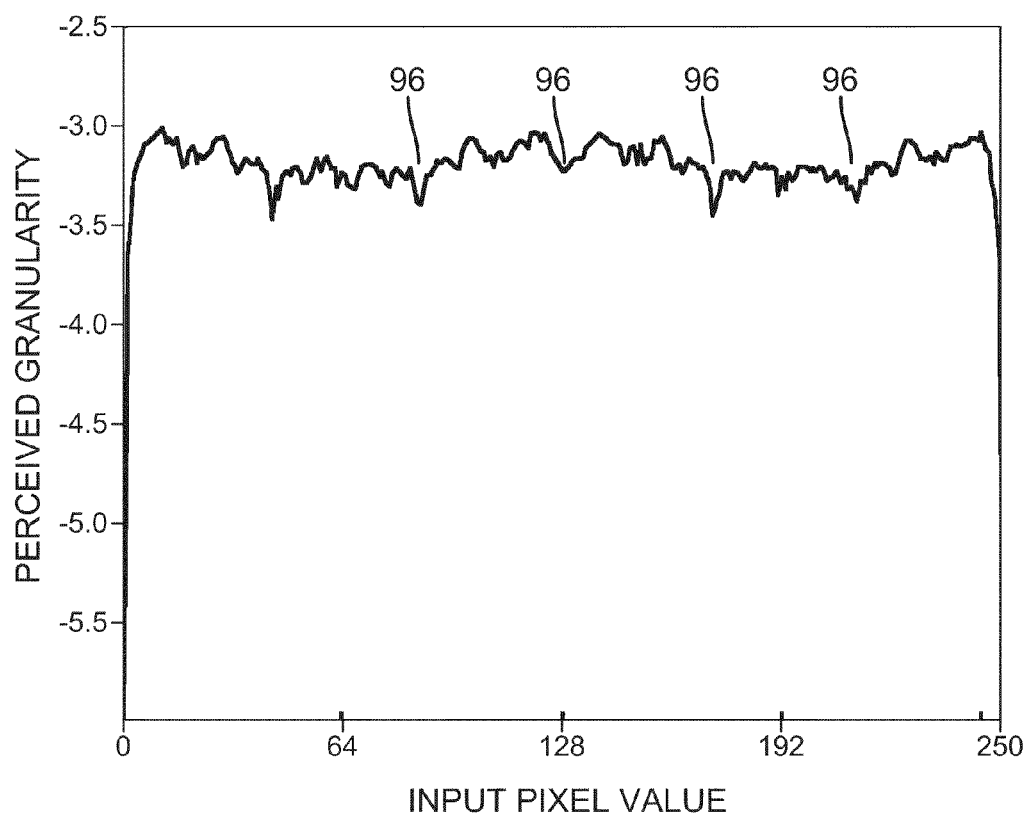
FIG. 14 shows a granularity vs. input pixel value relationship obtained using the method of FIG. 9.

A gray ramp produced using the method of Couwenhoven et al. is shown in FIG. 13. It can be seen that the texture characteristics across the tone scale are more uniform relative to any of the prior art halftoning methods shown in FIG. 7, and that the occurrence of worms and other texture artifacts is greatly reduced. A corresponding perceived granularity function is shown in FIG. 14 for comparison with that of the conventional multi-level error diffusion process given in FIG. 10. The dither signal adjustment function 46 shown in FIG. 11 and the error diffusion adjustment function 60 shown in FIG. 12 were used to produce these results. It can be seen that the non-uniformity of the perceived granularity function is much improved, producing reduced amplitude texture changes, labeled as 96 in the figure.

In one embodiment of the method of Couwenhoven et al., the periodic dither signal is arranged to have a mean value of zero. In this way the addition of the dither signal to the input signal will be mean preserving. However, this is not a strict requirement since one can account for any biases to the mean level by properly adjusting other pieces of the imaging chain, such as the quantizer 52.

In some cases, it can be desirable to adjust the distribution of periodic dither signals values as a function of the input pixel values. In particular, this can be desirable to ensure that the multi-level halftoning process is mean preserving. For example, near the ends of the tone scale, using a symmetric, zero-mean distribution of dither values can result in introducing a bias to the average gray level, since any negative dither values will not be able to produce an output value darker than black to offset any pixels that can be bumped up to the next highest output level. One way to ensure that the introduction of the periodic dither signal does not introduce any biases to the mean output level is to determine the desired distribution of output levels as a function of the input pixel value. For example, at an input level that is halfway between two of the output levels, it can be desired to map half of the pixels to the lower output level, and half of the pixels to the higher output level. Similarly, at an input level that is exactly equal to one of the output levels, it can be desirable to produce an overmodulated halftone pattern where 80% of the pixels are mapped to that output level, 10% of the pixels are mapped to the next lower output level, and 10% of the pixels are mapped to the next upper output level. The distribution of output values can be directly influenced (in those portions of the tone scale where the dither signal adjustment factor is large so that the ordered dither halftoning dominates) by adjusting the distribution of periodic dither signal values. For example, if it is desired that 10% of the pixels be mapped to the next highest output level, then it is necessary to arrange the distribution of periodic dither values such that 10% of the periodic dither values have a magnitude large enough to move the adjusted input pixel value into the next quantization bin of the quantizer 52. There are a number of ways that the distribution of periodic dither values can be adjusted on a pixel-by-pixel basis. For example, the periodic dither signal can be run through a look-up table to produce a modified dither value having a different distribution.

While the method of Couwenhoven et al. has been found to produce substantial improvements relative to prior art methods, it has been observed that there is still room for further improvement in the halftone patterns that it produces. In particular, subtle texture artifacts have been observed in certain image regions with smooth tonescale gradients. Investigation has revealed that these artifacts can be traced to tone levels where intermediate amplitude levels of dither are added to the image. With the method of Couwenhoven et al., the periodic dither signal has only an indirect ability to influence the resulting halftone pattern since it effectively adds a periodic noise to the input image, which is then further processed by an error diffusion step. In some cases, it has been observed that this method can produce small clumps of dots where they are not desirable.

The present invention represents a new method for combining error diffusion and dither to produced improved texture uniformity that produces reduced artifact levels relative to the prior art method of Couwenhoven et al. Whereas the prior art method involved modifying the amplitude of a periodic dither signal added to an input image as a function of the input pixel value, the present invention involves modifying the fraction of the pixels in the input image that are processed using a dither algorithm rather than an error diffusion algorithm as a function of the input pixel level.

Figure 15:
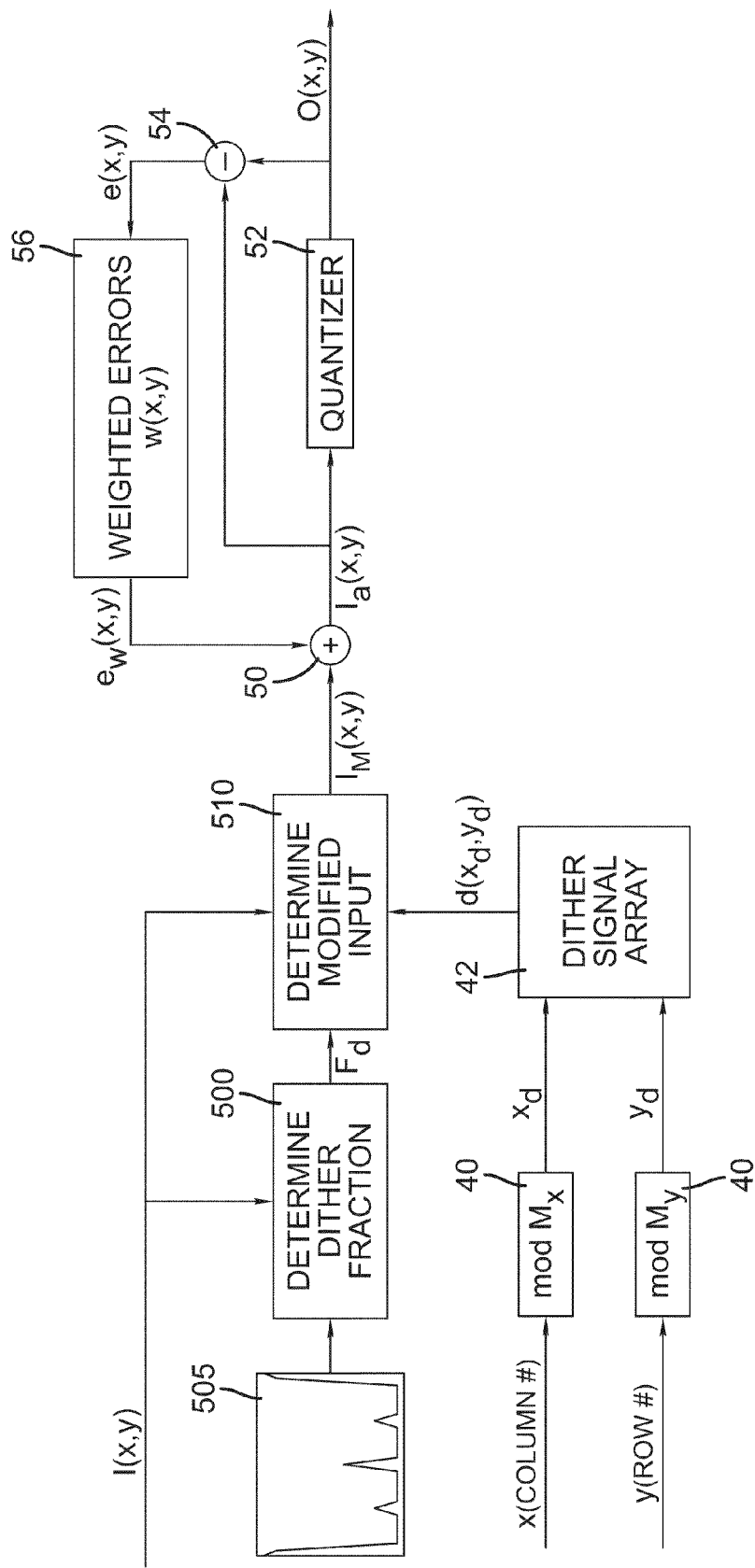
FIG. 15 shows a flow diagram illustrating the method of the present invention.

Turning now to FIG. 15, a flow diagram illustrating the method of the present invention will now be described. Where appropriate, the same part numbers have been used in FIG. 15 that were used for the method of Couwenhoven et al. shown in FIG. 9. As with the method of FIG. 9, this method can be used to process an input digital image having input pixels with corresponding input pixel values, $I(x,y)$, and $N_i$ input levels to form an output digital image having output pixels with corresponding output pixel values $O(x,y)$ and $N_o$ output levels, where $2 \leq N_o < N_i$. The column and row addresses of the input pixel are given by x and y, respectively. Modulo operators 40 are used to determine indices $x_d$ and $y_d$ into a dither signal array 42 from the row and column addresses x and y. The dither signal array is used to determine a periodic dither signal that is designed to have low visibility to a human observer.

In the present invention, the dither signal adjustment generator 44 of FIG. 9 is replaced by a dither fraction generator 500, which is used to determine a dither fraction $F_d$ responsive to the input pixel value I(x,y). In a preferred embodiment of the present invention, this is accomplished using a dither fraction function 505 which returns a dither fraction $F_d$ as a function of the input pixel value I(x,y). Generally the dither signal adjustment function 46 would be implemented using a look-up table (LUT), although it will be obvious to one skilled in the art that many other implementations are achievable. The dither fraction $F_d$ returned by the dither fraction function 505 is related to the texture characteristics that would result from the application of a multilevel error diffusion halftoning process to a uniform image region having the particular input pixel value, the dither fraction $F_d$ being larger for input pixel values where the multi-level error diffusion halftoning process produces visually objectionable texture characteristics (e.g., worm artifacts, texture contours, or the like) and smaller for input pixel values that where it produces visually pleasing texture characteristics.

Next, an input pixel modifier 510 is used to modify the input pixel values I(x,y) to produce modified input pixel values $I_M(x,y)$. The purpose of the input pixel modifier 510 is to modify a fraction of the input pixels in accordance with a periodic dither signal value $d(x_d, y_d)$, the fraction to be modified being specified by the dither fraction $F_d$. In a preferred embodiment of the present invention, the modified input pixel value $I_M(x,y)$ for the fraction of the pixels that are modified will correspond to the values that would be produced by a multi-level periodic dither halftoning algorithm. Any of a wide variety of periodic dither processes could be used to produce the periodic dither signal value $d(x_d, y_d)$, such as the prior art methods shown in FIGS. 3-6.

It can be seen that there is a significant difference between the present invention and the prior art method shown in FIG. 9. In the prior art method, a periodic dither signal of variable amplitude was added to all of the input pixels, whereas in the present invention a periodic dither signal of fixed amplitude is used to modify a fraction of the input pixels. While both methods are designed to achieve the same basic goal of breaking up the objectionable texture artifacts associated with a multi-level error diffusion halftoning process, the present invention has the advantage that it can more directly control the influence of the dither signal on the output image, thereby reducing visible artifacts.

Next, a multi-level error diffusion halftoning process is applied to the modified input pixel value $I_M(x,y)$ to determine an output pixel value O(x,y). This generally involves a series of steps. First, a quantizer 52 is used to map the modified input pixel value $I_M(x,y)$ to a corresponding output pixel value O(x,y). For the case of a binary output image, the quantizer will be a simple threshold function. For cases where the output image has more than two levels, the quantizer can be implemented using an integer divide operation, or using a quantization LUT, as is well known to one skilled in the art. A difference signal generator 54 is then used to compute an error signal e(x,y) representing the difference between an adjusted input pixel value $I_a(x,y)$ and the output pixel value O(x,y). The error signal e(x,y) represents the quantization error introduced by the quantizer 52. In a preferred embodiment of the method of the present invention, the difference signal generator 54 simply subtracts the adjusted input pixel value $I_a(x,y)$ from an appropriately scaled version of the output pixel value O(x,y). Next, a weighted error signal generator 56 is used to scale the error signal e(x,y) by a series of error feedback weights W(x,y) to produce a set of weighted error signal $e_w(x,y)$ that are adapted to be added to the modified input pixel values $I_M(x,y)$ of nearby pixels that have yet to be processed using an adder 64 to form adjusted input values $I_a(x,y)$. The propagation of the errors made during the thresholding process to the nearby pixels is intended to ensure that the arithmetic mean of the pixel values is preserved over a local image region. For the fraction of the pixels that were modified using the periodic dither signal value $d(x_d, y_d)$ by the input pixel modifier 510, the multi-level error diffusion process will essentially be a null operation since the modified input pixel values $I_M(x,y)$ will already correspond to one of the possible output levels O(x,y).

It should be noted that the amplitude of the weighted error signals $e_w(x,y)$ could optionally be adjusted in a manner similar to the prior art method shown in FIG. 9 where an error diffusion adjustment generator 58 was used to determine an error diffusion adjustment factor $f_e$ responsive to the input pixel value I(x,y). Typically, the amplitude of the weighted error signal $e_w(x_d, y_d)$ would be reduced for input pixel values where the multilevel error diffusion process would produce visually objectionable texture characteristics (e.g., worm artifacts, texture contours, or the like). Alternatively, the amplitude of the adjusted error signal could be reduced for only the input pixel values near the $N_o$ output levels.

As with the prior art method described above with reference to FIG. 9, there are a number of ways that the periodic dither signal value $d(x_d, y_d)$ can be determined using the dither signal array 42. In one preferred embodiment of the present invention, the dither signal array 42 is simply a dither matrix analogous to that used in the method of FIG. 4. However, as was described above, the dither signal array 42 could also correspond to an array of dither LUTs or an array of dither bitmaps, analogous to that used in the methods of FIG. 6 and FIG. 5, respectively.

As was noted earlier, in order for the periodic dither signal value $d(x_d, y_d)$ to smoothly blend with the halftone textures produced by the multi-level error diffusion process, it is desirable that the dither signal array be designed to produce periodic dither signal value $d(x_d, y_d)$ having "blue-noise" spatial frequency characteristics similar to the halftone patterns produced by the multi-level error diffusion halftoning process. In one preferred embodiment of the method of the present invention, the dither signal array is determined by using an optimization process to determine the dither signals that reduce a visual cost function as taught by Sullivan, et al. in U.S. Pat. Nos. 4,920,501 and 5,214,517. Such methods produce dither patterns that have spatial frequency characteristics quite similar to those produced by error diffusion processes. Other methods that can also be used to produce dither signals having similar spatial frequency characteristics have been discussed above. For cases where the periodic dither signal is used to produce modified input pixel values $I_M(x,y)$ having overmodulation characteristics near the N output levels, blue-noise dither matrices that are designed to produce "binars" are preferred, as has been discussed earlier.

Analogous to the discussion above relative to dither signal adjustment function 46 in FIG. 9, there are many ways that could be used to determine the exact form of the dither fraction generator 500. In a preferred embodiment of the present invention, the dither fraction generator 500 is designed such that magnitude of the dither fraction $F_d$ is approximately proportional to the magnitude of any undesirable texture characteristics that occur in halftone patterns produced by the multi-level error diffusion process. For example, as described earlier, this could be done using methods that estimate or measure the magnitude of any undesirable texture characteristics, or alternatively could be done by manually refining the form of the dither fraction function 505. The dither signal adjustment function 46 shown in FIG. 11 represents one example of a function that would be appropriate to be used for the dither fraction function 505.

The input pixel modifier 510 will now be described in more detail. The function of this operation is to modify a fraction of the input pixels, specified by the dither fraction $F_d$, using a periodic dither signal value $d(x_d, y_d)$. In a preferred embodiment of the present invention, the input pixels for the selected fraction of the input pixels are modified by applying a multi-level halftoning algorithm to the selected input pixels. This operation can be viewed as being segmented into two distinct steps. The first step is to determine whether a particular input pixel should be modified. This can be accomplished using some sort of random or pseudo-random process, or preferably can be accomplished according to a "blue-noise" pattern. The probability of identifying a pixel to be modified is given by the dither fraction $F_d$. For example, if the dither fraction for a particular input pixel value is determined to be $F_d$=0.30, then the probability that a pixel will be identified to be modified would be 30%.

The second step is to use the dither signal $d(x_d, y_d)$ to determine the modified input pixel value $I_M(x,y)$ for those input pixels that are identified to be modified. This would generally be accomplished by applying a multi-level dither halftoning algorithm, such as those shown in FIGS. 3-6, where the modified input pixel value $I_M(x,y)$ is set to be equal to the output pixel value $O(x,y)$ produced by the multi-level dither halftoning algorithm. For those input pixels that are not identified to be modified, the modified input pixel value $I_M(x, y)$ is simply set equal to the original input pixel value $I(x,y)$. Since the modified input pixel value $I_M(x,y)$ for the fraction of the input pixels that are to be modified are already equal to one of the available output levels, the multi-level error diffusion halftoning process will not further modify those pixels.

Figure 16:
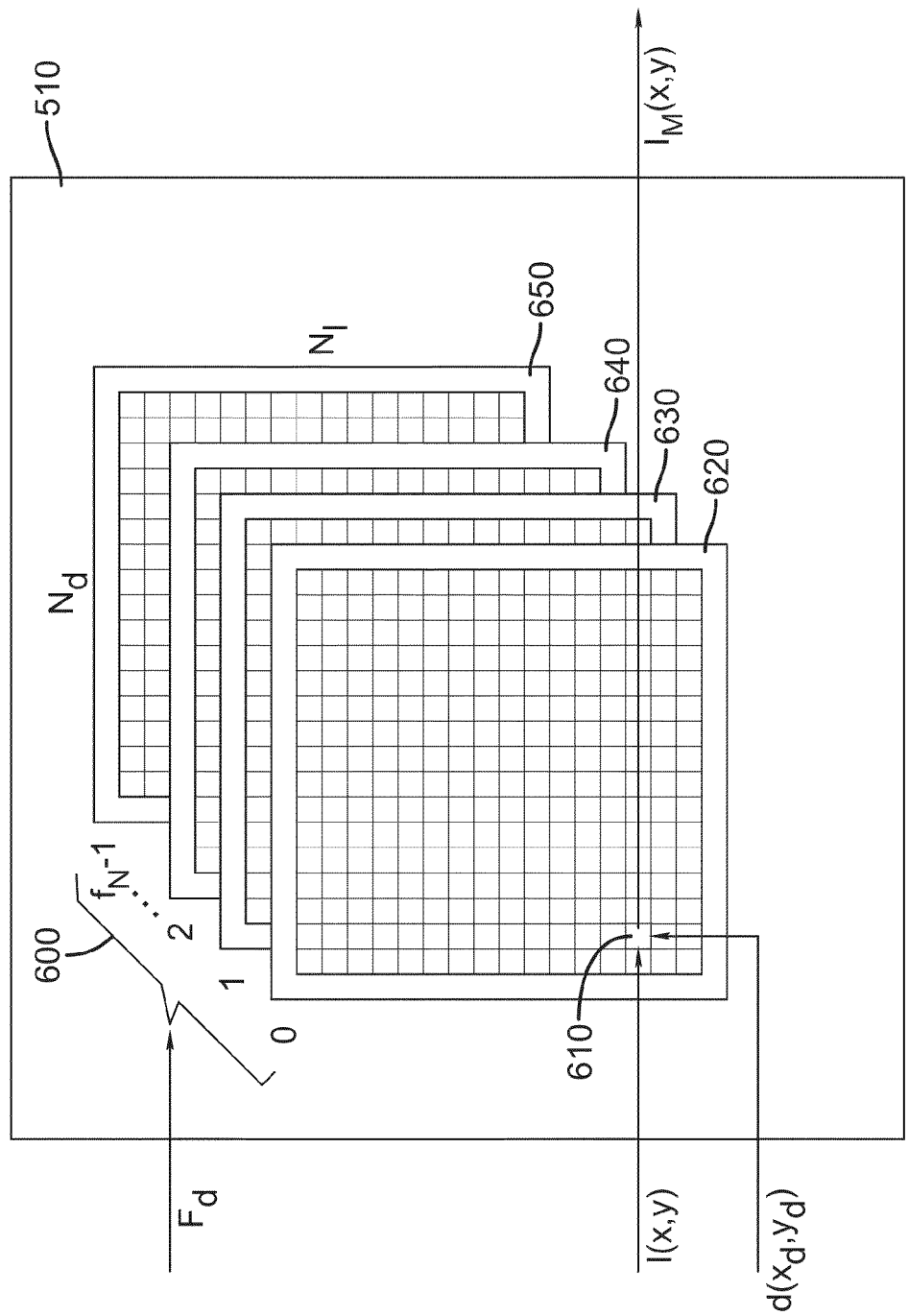
FIG. 16 shows a flow diagram for a preferred embodiment of the input pixel modifier.

In a preferred embodiment of the present invention, the two steps of identifying the pixels to be modified and them modifying these pixels can be conveniently and efficiently combined using the method shown in FIG. 16 which shows a flowchart for one implementation of an input pixel modifier 510. This method works by defining a set of 2-D arrays 600, each of the 2-D arrays being comprised of a 2-D array of cells. Each of the 2-D arrays in the set of 2-D arrays 600 corresponds to a different dither fraction $F_d$. For example, 2-D array 620 would correspond to a dither fraction of $F_d$=0.0, 2-D array 650 would correspond to a dither fraction of $F_d$=1.0, and 2-D arrays 630 and 640 would correspond to intermediate dither fraction values. The number of 2-D arrays in the set of 2-D arrays 600 is determined by the number of distinct dither fractions that can be produced by the dither fraction generator 500. It has been found that good results can be obtained with approximately 33 different 2-D arrays, corresponding to 33 different dither fractions, particularly if they are non-linearly spaced to more finely sample the smaller dither fraction values. Slightly improved results can be obtained by using more 2-D arrays at the expense of requiring a larger amount of memory for storing the set of 2-D arrays 600. In some cases, it may be acceptable to use fewer than 33 different 2-D arrays in order to save memory at the risk of introducing some artifacts.

For a given input pixel, one of the 2-D arrays is selected according to the dither fraction $F_d$ that was determined using the dither fraction generator 500. The selected 2-D arrays is then addressed in one dimension by the input pixel value $I(x,y)$ and in the other dimension by the periodic dither signal value $d(x_d, y_d)$ to determine a selected array cell 610. In a preferred embodiment of the present invention, the values stored in the cells of the 2-D arrays are the desired modified input pixel values $I_M(x,y)$. For a fraction of the cells, the modified input pixel values $I_M(x,y)$ are set to be equal to the input pixel values $I(x,y)$. For the remaining fraction of the cells, the modified input pixel values $I_M(x,y)$ represent the output values of a multi-level dither halftoning process analogous to the method shown in FIG. 6.

Alternately, rather than storing the modified input pixel values $I_M(x,y)$ directly in the cells of the 2-D arrays, indices can be stored that can be used to determine the appropriate modified input pixel values $I_M(x,y)$. For example, for a 3-level multi-toning process, index values of 0, 1 and 2 could be stored in the cells of the 2-D arrays to indicate the three different output levels, and an index value of 4 can be stored to indicate that the input pixel value should not be modified. In this case, the index value would be used by a subsequent process to determine the modified input pixel values $I_M(x,y)$.

To illustrate how the method shown in FIG. 16 can be used to implement the two steps described above that are associated with the input pixel modifier 510, consider FIGS. 17-20, which illustrate a series of four example 2-D arrays corresponding to four different dither fractions. For this example, a 3-level multi-level dither halftoning process is used that outputs low, medium and high output levels. For example, the low, medium and high output levels could be 0, 128 and 255 for the case of an 8-bit image signal.

Figure 17:
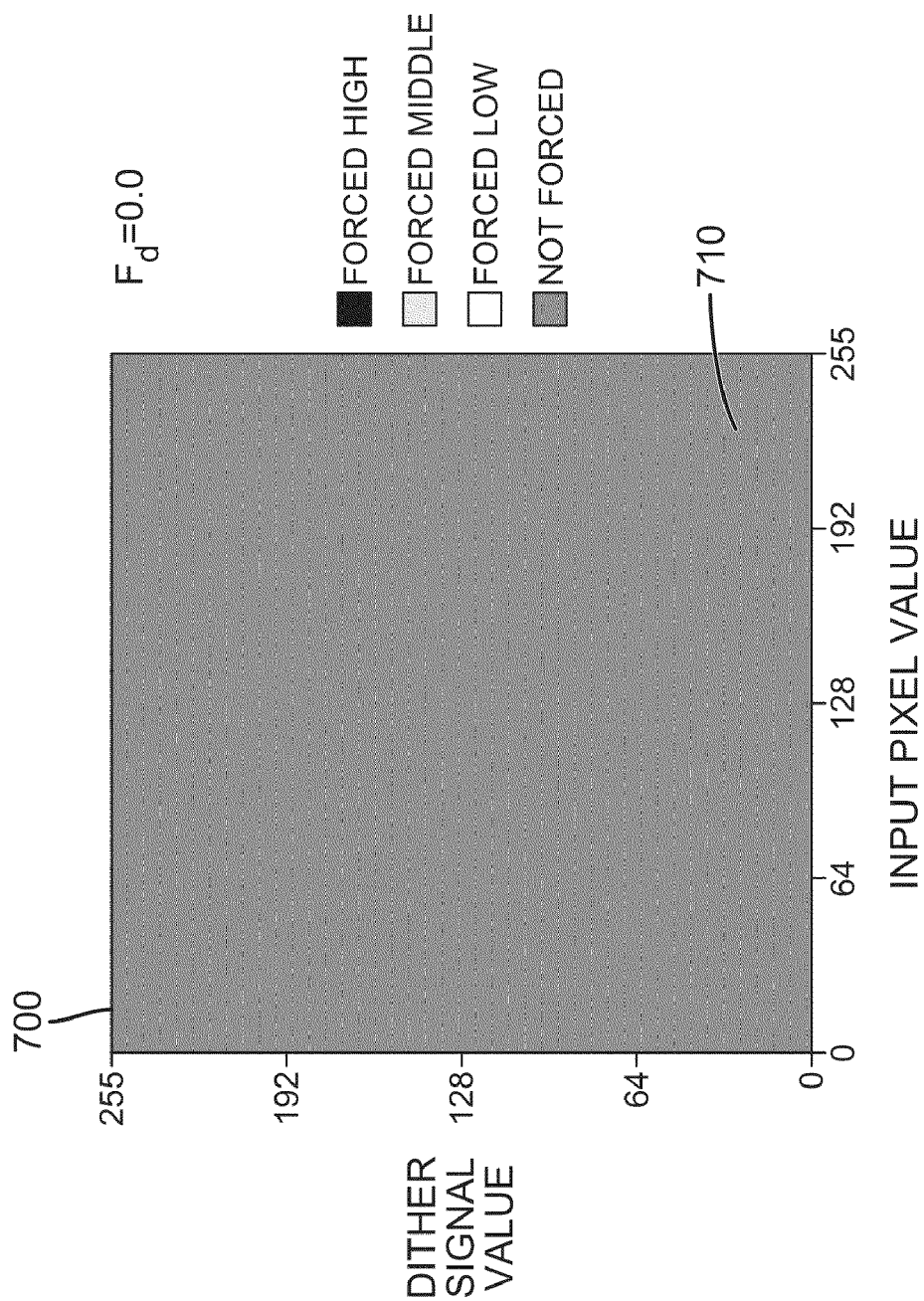
FIG. 17 shows an example 2-D array corresponding to a dither fraction of $F_d$=0.0 for use in the input pixel modifier of FIG. 16.

FIG. 17 illustrates a 2-D array 700 corresponding to a dither fraction of $F_d$=0.0. In this case, none of the pixels should be modified by the periodic dither signal, and therefore the entire 2-D array 700 includes not forced cells 710 that are not forced to any of the three output levels. The modified input pixel values $I_M(x,y)$ stored in each not forced cells 710 would just be set equal to the input pixel values $I(x,y)$. Accordingly, the first column of the 2-D array 700 would be filled with values of 0, the second column of the 2-D array 700 would be filled with values of 1, and so forth up to the last column of the 2-D array 700 which would be filled with values of 255. Consequently, for pixels where $F_d$=0.0, the modified input pixel values $I_M(x,y)$ will simply be set equal to the input pixel values $I(x,y)$, independent of the periodic dither signal value $d(x_d, y_d)$.

Figure 18:
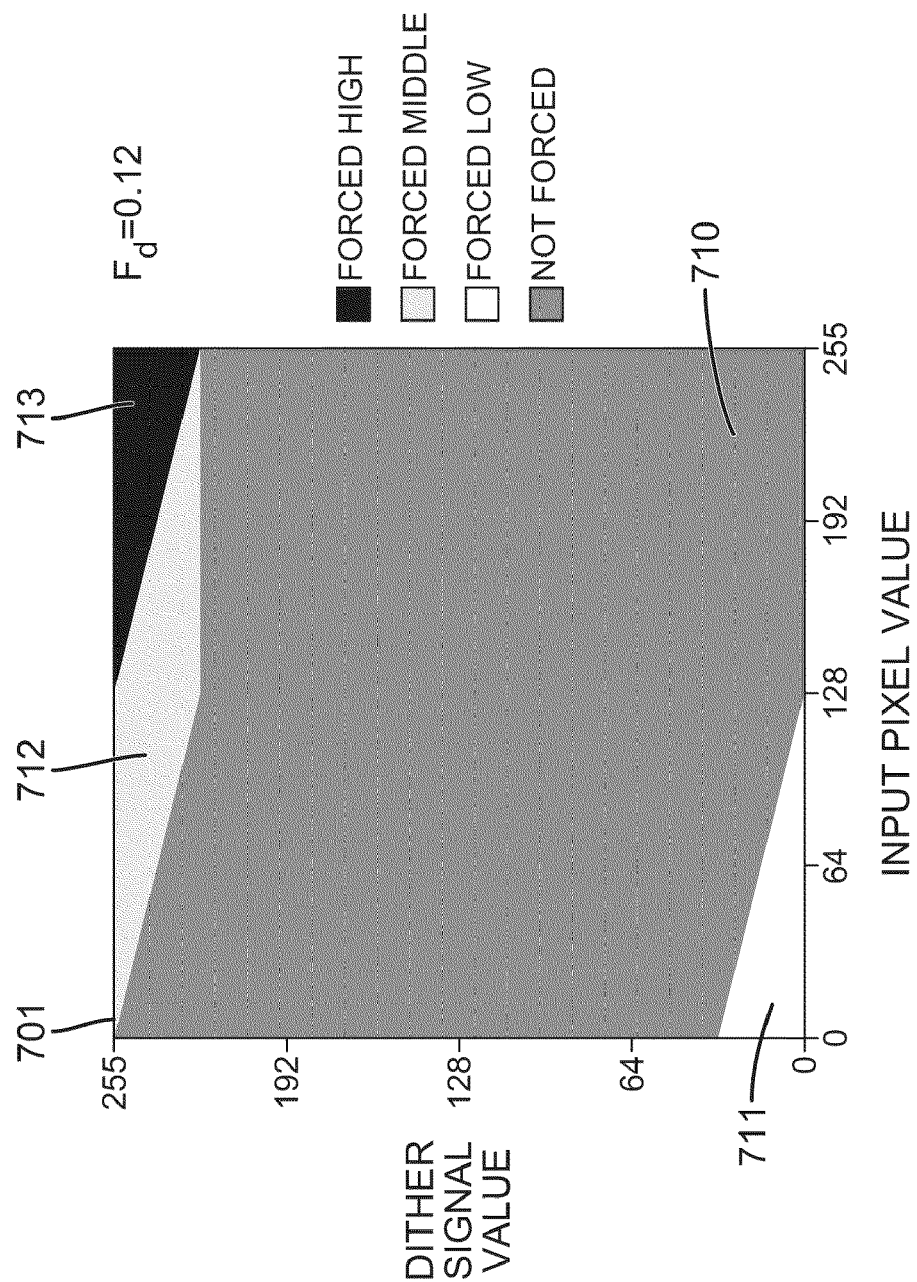
FIG. 18 shows an example 2-D array corresponding to a dither fraction of $F_d$=0.12 for use in the input pixel modifier of FIG. 16.

FIG. 18 illustrates a 2-D array 701 corresponding to a dither fraction of $F_d$=0.12. In this case, 12% of the pixels should be modified by the periodic dither signal, and therefore 78% of the 2-D array 701 includes not forced cells 710 that are not forced to any of the output levels. The remainder of the cells includes forced low cells 711 which are filled with the low output value (e.g., 0), forced middle cells 712 which are filled with the middle output value (e.g., 128), and forced high cells 713 which are filled with the high output value (e.g., 255). For any column of the 2-D array 701, the sum of the number of forced low cells 711, forced middle cells 713 and forced high cells 713 will be 12% of the total number of cells in that column. As was discussed with reference to FIG. 17, the modified input pixel values $I_M(x,y)$ stored in each not forced cells 710 would just be set equal to the input pixel values $I(x,y)$. For a given input pixel value $I(x,y)$, the relative fractions of the forced low cells 711, the forced middle cells 712, and the forced high cells 713 in the corresponding column of the 2-D array 701 correspond to the appropriate fractions of the pixels that are desired for the halftone pattern. For example, if the input pixel value is 64, half of the forced pixels should be forced to the low output value (e.g., 0) and half of the forced pixels should be forced to the middle output vale (e.g., 128). This is reflected in the relative proportions of forced low cells 711 and the forced middle cells 712, each of which correspond to 6% of the dither signal value range for the column of the 2-D array 701 when the input pixel value is 64. Likewise, when the input pixel value is 128, all of the forced cells are forced middle cells 712 reflecting the fact that the multi-level halftone pattern should be composed of middle output values. The spatial distribution of the pixels that will be forced low, forced middle, forced high and not forced will be determined by the distribution of the dither signal values in the dither signal array 42 of FIG. 15. If a so-called blue-noise dither array is used, the resulting forced pixels in the image will correspond to a blue noise halftone pattern.

Figure 19:
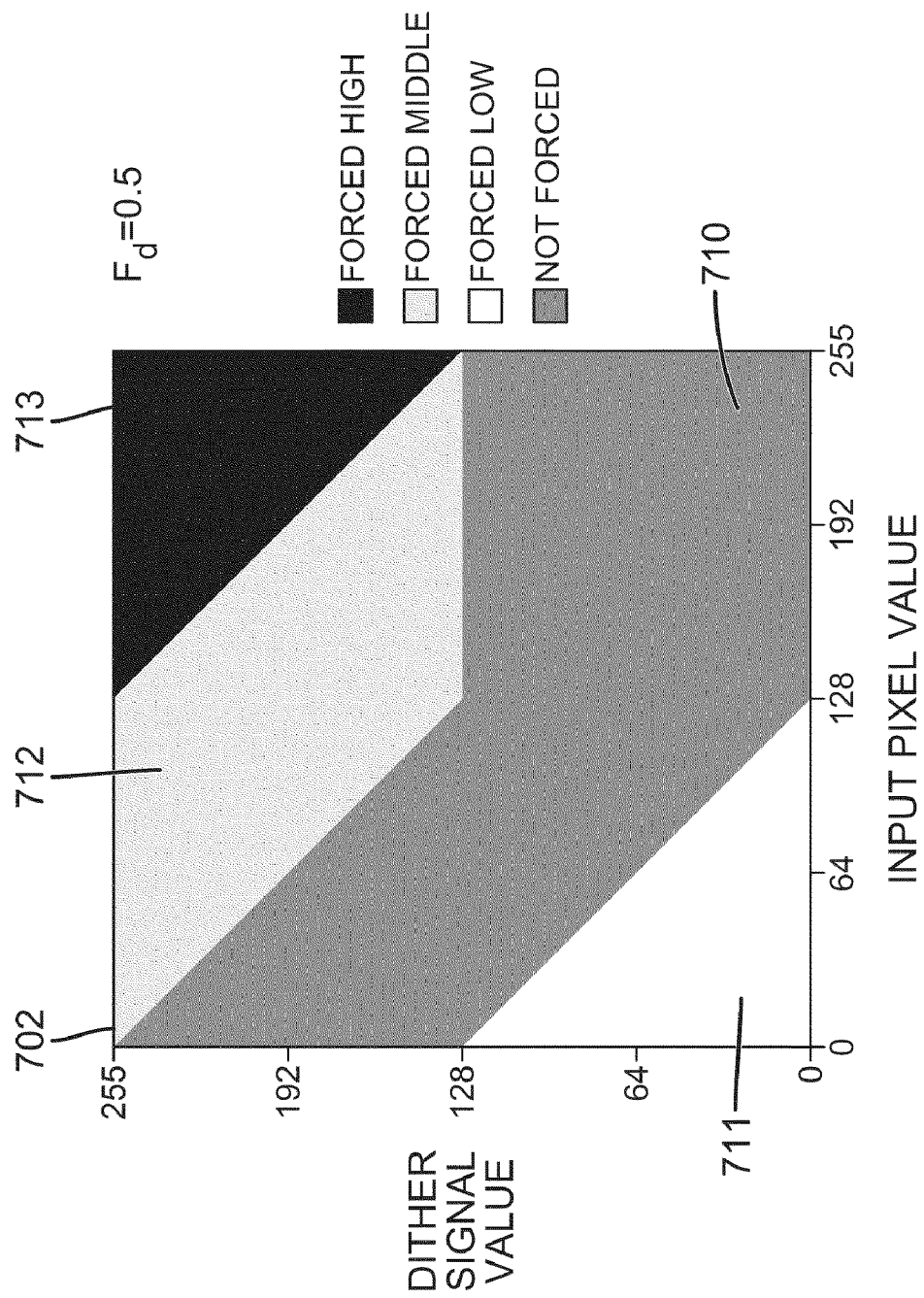
FIG. 19 shows an example 2-D array corresponding to a dither fraction of $F_d=0.5$ for use in the input pixel modifier of FIG. 16.

Similarly, FIG. 19 shows a 2-D array 702 corresponding to a dither fraction of $F_d$=0.50. In this case, 50% of the pixels should be modified by the periodic dither signal, and therefore 50% of the 2-D array 702 includes not forced cells 710 that are not forced to any of the output levels. As before, the remainder of the cells include forced low cells 711, forced middle cells 712, and forced high cells 713.

Figure 20:
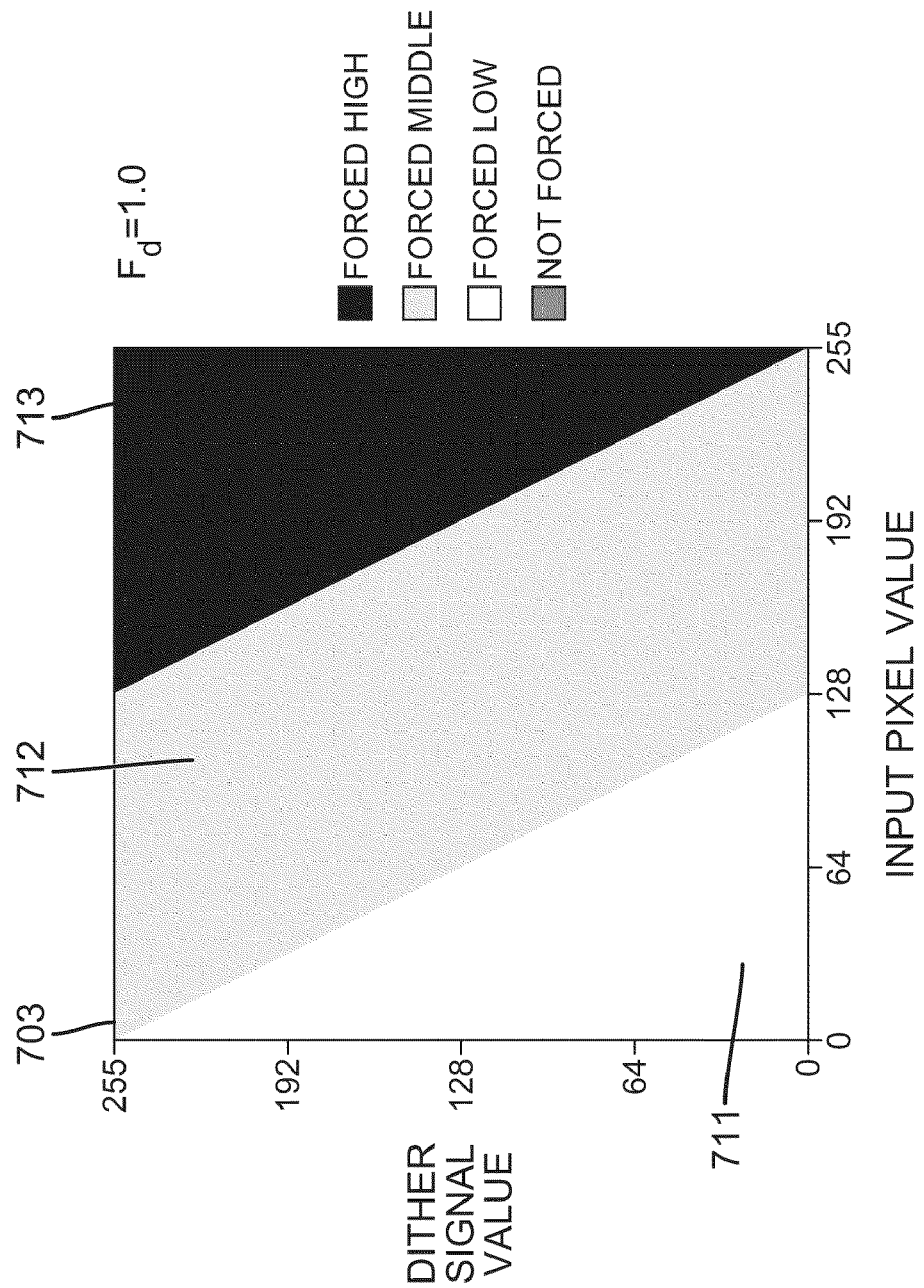
FIG. 20 shows an example 2-D array corresponding to a dither fraction of $F_d=1.0$ for use in the input pixel modifier of FIG. 16.

Likewise, FIG. 20 shows a 2-D array 703 corresponding to a dither fraction of $F_d=1.0$. In this case, 100% of the pixels should be modified by the periodic dither signal, and therefore there are no not forced cells 710 in the 2-D array 703. In this case, all of the cells include forced low cells 711, forced middle cells 712, and forced high cells 713. For image regions where $F_d=1.0$, the modified input pixel values $I_M(x,y)$ will simply correspond to the output values for an image which has been processed by a multi-level dither halftoning process.

It will be understood by one skilled in the art that a variety of characteristics can be obtained by appropriate design of the values stored in the set of 2-D arrays 600. For example, over-modulated dither patterns, such as those described by Yu et al. in "Digital Multitoning Evaluation with a Human Visual Model," *IS&T's NIP13: International Conference on Digital Printing Technologies,* 579-585 (1997), can be produced by simply modifying the relative fractions of the forced low cells 711, forced middle cells 712, and forced high cells 713 in each column of the 2-D arrays. Consider the 2-D array 703 shown in FIG. 20 corresponding to a dither fraction of $F_d=01.0$. At an input pixel value of 128, the full range of dither signal values are all mapped to forced middle cells 712. Over-modulated halftone patterns could be obtained by mapping a fraction of the dither signal values (e.g., 10%) to forced low cells 711 and forced high cells 713.

Figure 21:
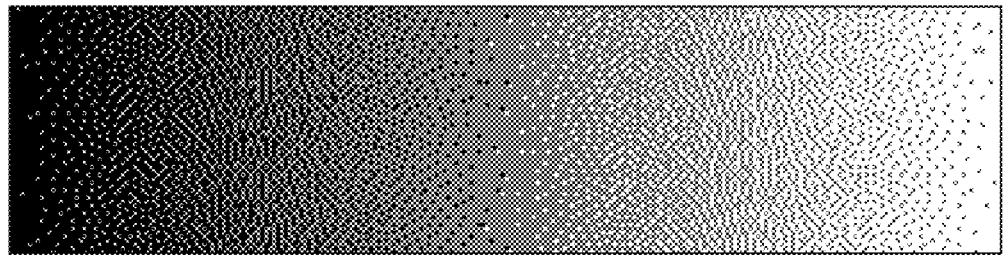
FIG. 21 depicts a gray wedges illustrating output produced using the method of the present invention.
Figure 22:
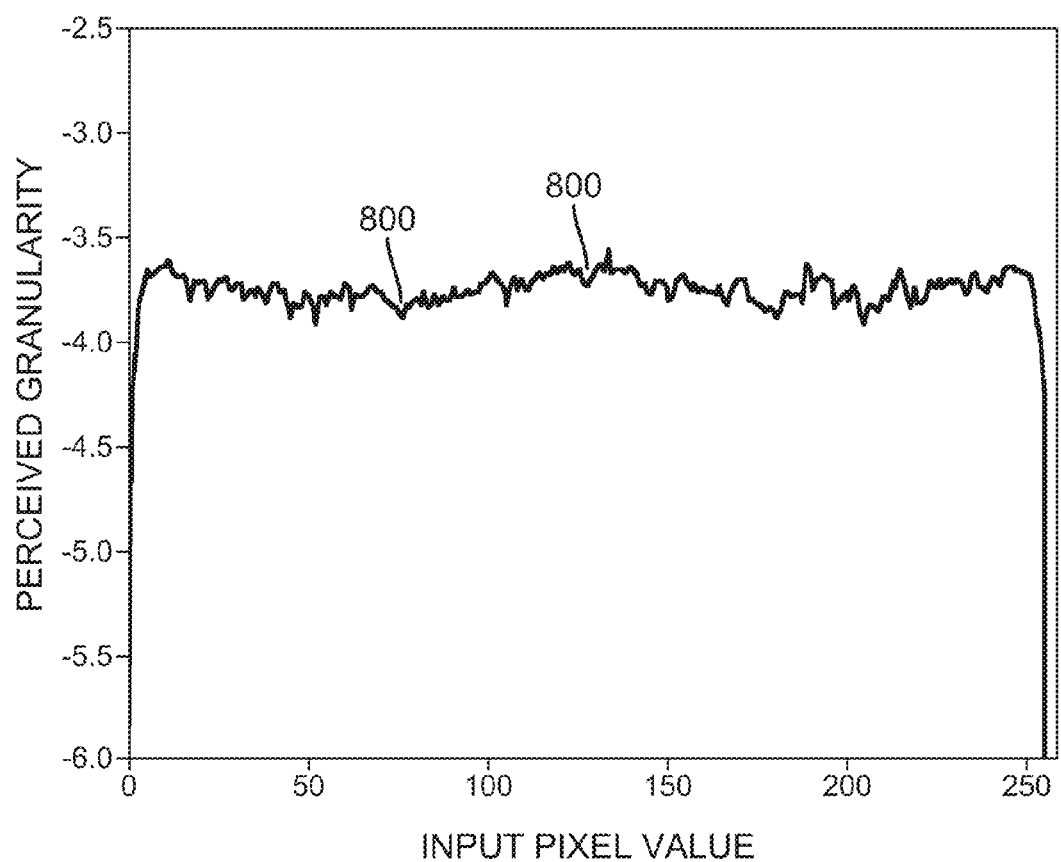
FIG. 22 shows a granularity vs. input pixel value relationship obtained using the method of the present invention.
Figure 23:
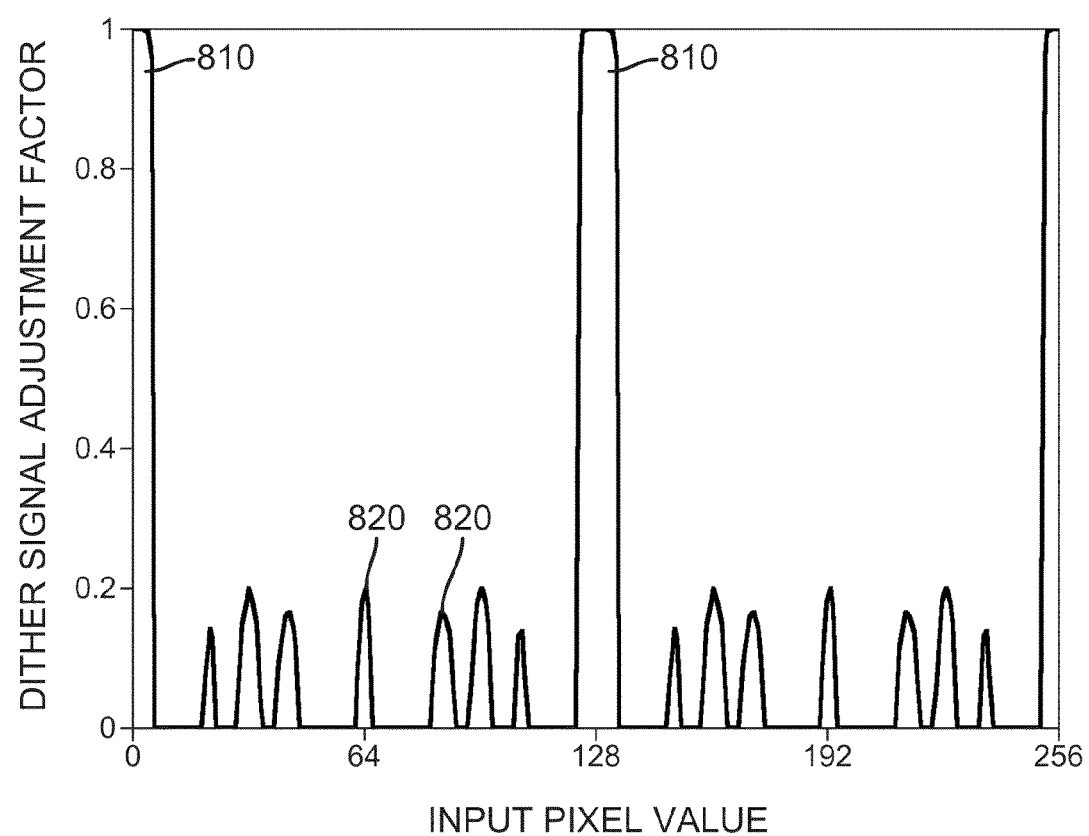
FIG. 23 illustrates a typical dither fraction function for use with the method of the present invention.

A gray ramp produced using the method of the present invention is shown in FIG. 21. It can be seen that the texture characteristics across the tone scale are more uniform relative to any of the prior art halftoning methods shown in FIG. 7, and that the occurrence of worms and other texture artifacts is greatly reduced. A corresponding perceived granularity function is shown in FIG. 22 for comparison with that of the conventional multi-level error diffusion process given in FIG. 10. It can be seen that the non-uniformity of the perceived granularity function is much improved, producing reduced amplitude texture changes, labeled as 800 in the figure. The dither fraction function 505 used to generate the results shown in FIG. 21 is illustrated in FIG. 23. It can be seen that the dither fraction function 505 has peaks near input values of 0, 128 and 255 corresponding to the output levels, labeled as 810 in the figure. It also has a series of intermediate dither signal adjustment function peaks (i.e., local maxima) corresponding to other input pixel values that produce objectionable texture artifacts, labeled as 820 in the figure.

The method of the present invention has been described with reference to a single color channel image, such as those associated with a so-called "black-and-white" printer. The method can also be applied to color imaging devices as well. For example, if a color printer has cyan, magenta, yellow and black color channels, the method of the present invention can be applied individually to each of the color channels. Alternatively, some multi-level error diffusion halftoning processes are color error diffusion processes that operate simultaneously on multiple color channels. Many variations of these so-called "vector error diffusion" processes are well known to those skilled in the art It is straightforward to adapt the method of the present invention to work with any of these types of halftoning. In this case, the dither fraction for each color channel could be determined independently for each color channel of the input digital image according to the input pixel values for the corresponding color channel. Alternately, the dither fraction could be determined using a multi-dimensional dither fraction function that is a function of the input pixel values for multiple color channels of the input digital image.

In some cases, the same dither signal array 42 could be used for each of the color channels. Alternatively, different dither signal arrays, or modified versions of a single dither signal array, could be used for each color channel. For example, shifted or inverted dither signal arrays could be used, or jointly optimized dither signal arrays could be used such as those described by Spaulding, et al. in U.S. Pat. No. 5,822,451.

A computer program product having a computer readable storage medium can have a computer program stored thereon for performing all the steps of the present invention. The computer readable storage medium can comprise any physical device or medium employed to store a computer program including the examples mentioned earlier.

The invention has been described in detail with particular reference to certain preferred embodiments thereof, but it will be understood that variations and modifications can be effected within the spirit and scope of the invention.

PARTS LIST 10 threshold operator
12 difference signal generator
14 weighted error signal generator
16 adder
20 modulo operator
22 dither matrix
24 comparator
26 adder
28 threshold operator
30 modulo operator
32 dither bitmaps
34 dither LUT selector
36 dither LUTs
40 modulo operator
42 dither signal array
44 dither signal adjustment generator
46 dither signal adjustment function
48 multiplier
50 adder
52 quantizer
54 difference signal generator
56 weighted error signal generator
58 error diffusion adjustment generator
60 error diffusion adjustment function
62 multiplier
64 adder
70 worm artifacts
71 increased graininess
72 texture/luminance contour
73 texture contour
74 worm artifacts
80 lower output level
81 higher output level
82 intermediate output level
86 texture changes near output levels
88 texture changes intermediate to output levels
90 dither signal adjustment function peaks near output levels
92 intermediate dither signal adjustment function peaks
94 error diffusion adjustment function minima near output levels
96 reduced amplitude texture changes
500 dither fraction generator
505 dither fraction function
510 input pixel modifier
600 set of 2-D arrays
610 selected array cell
620 2-D array ($F_d=0.0$)
630 2-D array (intermediate $F_d$ value)

640 2-D array (intermediate $F_d$ value)
650 2-D array ($F_d$=1.0)
700 2-D array ($F_d$=0.0)
701 2-D array ($F_d$=0.12)
702 2-D array ($F_d$=0.50)
703 2-D array ($F_d$=1.0)
710 not forced cells
711 forced low cells
712 forced middle cells
713 forced high cells
800 reduced amplitude texture changes
810 dither fraction function peaks near output levels
820 intermediate dither fraction function peaks

The invention claimed is:

1. A method for multi-level error diffusion halftoning an input digital image having input pixels with corresponding input pixel values and $N_i$ input levels to form an output digital image with reduced error diffusion texture contouring artifacts, such an output digital image having output pixels with corresponding output pixel values and $N_o$ output levels, where $2 \leq N_o < N_i$, comprising:
   a) determining a fraction of input pixels to be modified using a periodic dither signal in response to the input pixel value of the input pixel, wherein the fraction of input pixels is a function of the texture artifact characteristics that would result from the application of a multi-level error diffusion halftoning process to a uniform image region having the particular input pixel value, the fraction of input pixels being larger for input pixel values that would produce visually objectionable texture artifact characteristics than for input pixel values that would produce visually pleasing texture characteristics;
   b) modifying the input pixel values for the determined fraction of input pixels using a periodic dither signal determined by modularly addressing a dither signal array with the row and column address of the input pixel in the input digital image, wherein the dither signal array is designed to produce periodic dither signals having low visibility to a human observer;
   c) applying the multi-level error diffusion halftoning process to the adjusted pixel value to determine the output pixel value; and
   d) repeating steps a)-d) for multiple input pixels of the input digital image to thereby provide the output digital image.

2. The method according to claim 1 wherein the dither signal array is determined by reducing a visual cost function.

3. The method according to claim 1 wherein the dither signal array is designed to produce periodic dither signals having spatial frequency characteristics similar to those produced by the multi-level error diffusion halftoning process.

4. The method according to claim 1 wherein the dither signal array is a dither matrix storing periodic dither values, end wherein large dither matrix elements are paired with and are arranged to be adjacent to small dither matrix elements in the dither matrix.

5. The method according to claim 1 wherein step b) includes modifying the input pixel values by applying a multi-level dither halftoning process that uses the periodic dither signal, such that the modified input pixels values correspond to the $N_o$ output levels.

6. The method according to claim 1 wherein the multi-level error diffusion halftoning process is a binary error diffusion halftoning process producing output pixel values with two output levels.

7. The method according to claim 1 wherein the texture characteristics correspond to a perceived granularity value for the halftoning pattern produced by multi-level error diffusion halftoning process.

8. The method according to claim 1 wherein the texture characteristics correspond to a texture visibility value for the halftoning pattern produced by multi-level error diffusion halftoning process.

9. The method according to claim 1 wherein the fraction of input pixels to be modified is adjusted to produce an output digital image having more uniform texture characteristics.

10. The method according to claim 1 wherein the multi-level error diffusion halftoning process in step d) includes:
    i) applying a quantization operation to the adjusted pixel value to determine the output pixel value;
    ii) determining an error signal by computing a difference between the output pixel value and the adjusted pixel value; and
    iii) scaling the error signal by a set of error feedback weights and adding the scaled error weights to the input pixel values for nearby input pixels that have yet to be processed.

11. The method according to claim 1 wherein the multi-level error diffusion halftoning process in step d) includes producing an error feedback signal, and wherein the amplitude of the error feedback signal is adjusted responsive to the input pixel value of the input pixel.

12. The method according to claim 11 wherein the amplitude of the error feedback signal is adjusted to be smaller for input pixel values that would produce visually objectionable texture characteristics when the multi-level error diffusion halftoning process is applied to a uniform image region having the particular input pixel value, and larger for input pixel values that would produce visually pleasing texture characteristics when the multi-level error diffusion halftoning process is applied to a uniform image region having the particular input pixel value.

13. The method according to claim 1 wherein the input digital image is a color input digital image having a plurality of color channels and the multi-level error diffusion halftoning process is a color error diffusion process.

14. The method according to claim 13 wherein different dither signal arrays are used for each color channel of the input digital image.

15. The method according to claim 14 wherein the dither signal arrays used for each color channels are jointly optimized.

16. The method according to claim 13 where the fraction of input pixels to be modified are determined independently for each color channel as a function of the input pixel values for the corresponding color channel.

17. The method according to claim 13 where the fraction of input pixels to be modified is determined using a multi-dimensional dither fraction function that is a function of the input pixel values for multiple color channels of the input digital image.

18. The method according to claim 13 wherein the color multi-level error diffusion process is a vector error diffusion process.

19. A method for multi-level halftoning a color input digital image having a plurality of color channels where the method according to claim 1 is applied to at least one color channel of the color input digital image.

* * * * *